United States Patent
Gosu et al.

(10) Patent No.: US 11,748,058 B2
(45) Date of Patent: *Sep. 5, 2023

(54) COMMAND CONFIRMATION FOR A MEDIA PLAYBACK DEVICE

(71) Applicant: Spotify AB, Stockholm (SE)

(72) Inventors: Emma-Camelia Gosu, Nacka (SE);
Daniel Bromand, Stockholm (SE);
Karl Humphreys, London (GB)

(73) Assignee: Spotify AB, Stockholm (SE)

( * ) Notice: Subject to any disclaimer, the term of this patent is extended or adjusted under 35 U.S.C. 154(b) by 162 days.

This patent is subject to a terminal disclaimer.

(21) Appl. No.: 17/142,831

(22) Filed: Jan. 6, 2021

(65) Prior Publication Data
US 2021/0200509 A1    Jul. 1, 2021

Related U.S. Application Data

(63) Continuation of application No. 15/973,173, filed on May 7, 2018, now Pat. No. 10,908,873.

(51) Int. Cl.
*G06F 3/16* (2006.01)
*H04L 65/60* (2022.01)

(52) U.S. Cl.
CPC .............. *G06F 3/167* (2013.01); *G06F 3/165* (2013.01); *H04L 65/60* (2013.01); *G10H 2210/076* (2013.01)

(58) Field of Classification Search
CPC .............. G10L 15/22; G10L 2015/223; G10L 2015/225; G06F 3/167; G06F 3/165; H04L 65/60; G10H 2210/076
See application file for complete search history.

(56) References Cited

U.S. PATENT DOCUMENTS

| | | | |
|---|---|---|---|
| 6,965,863 B1 | 11/2005 | Zuberec | |
| 8,392,199 B2* | 3/2013 | Otani | G10L 21/02 |
| | | | 324/458 |
| 9,036,832 B2* | 5/2015 | You | G11B 20/10 |
| | | | 381/104 |
| 9,248,841 B1 | 2/2016 | MacNeille | |
| 9,311,043 B2 | 4/2016 | Rottler et al. | |
| 9,495,974 B1* | 11/2016 | Chang | G10L 21/0364 |
| 9,686,400 B2 | 6/2017 | Queru | |
| 10,147,439 B1 | 12/2018 | Kristijansson | |
| 10,192,553 B1 | 1/2019 | Chenier | |
| 10,908,873 B2 | 2/2021 | Gosu | |
| 2002/0011143 A1 | 1/2002 | Uehara | |
| 2007/0061067 A1 | 3/2007 | Zeinstra et al. | |
| 2009/0222270 A2 | 9/2009 | Likens | |

(Continued)

OTHER PUBLICATIONS

Extended European Search Report from European Appl'n No. 19171774.3, dated Sep. 17, 2019.

(Continued)

*Primary Examiner* — Linda Wong
(74) *Attorney, Agent, or Firm* — Merchant & Gould P.C.

(57) ABSTRACT

A system and method for confirming a voice command of a media playback device is disclosed. The method includes receiving an instruction of a voice command and producing an audio confirmation of the command. A confirmation may be playing a media context item associated with the command, playing a verbal confirmation phrase, or playing a non-verbal audio cue.

20 Claims, 14 Drawing Sheets

(56) References Cited

U.S. PATENT DOCUMENTS

| | | |
|---|---|---|
| 2010/0064218 A1 | 3/2010 | Bull et al. |
| 2014/0195251 A1 | 7/2014 | Zeinstra et al. |
| 2014/0309789 A1 | 10/2014 | Ricci |
| 2015/0142440 A1 | 5/2015 | Parkinson et al. |
| 2015/0266377 A1 | 9/2015 | Hampiholi et al. |
| 2015/0321604 A1 | 11/2015 | MacNeille et al. |
| 2016/0236690 A1 | 8/2016 | Juneja et al. |
| 2017/0200449 A1 | 7/2017 | Penilla |
| 2017/0242651 A1 | 8/2017 | Lang et al. |
| 2017/0243587 A1 | 8/2017 | Plagge et al. |
| 2018/0048750 A1 | 2/2018 | Hardi |
| 2018/0293985 A1 | 10/2018 | Weingartner |
| 2019/0013025 A1 | 1/2019 | Alcorn |
| 2019/0019504 A1 | 1/2019 | Hatambeiki |
| 2019/0027032 A1 | 2/2019 | Arunachalam |
| 2019/0197222 A1 | 6/2019 | Clark |
| 2019/0311718 A1 | 10/2019 | Huber |
| 2019/0361670 A1* | 11/2019 | Lang .................. H04R 29/007 |

OTHER PUBLICATIONS

Extended European Search Report in Application 20153211.6, dated Mar. 4, 2020, 6 pages.
European Office Action in Application 20153211.6, dated Mar. 3, 2021, 5 pages.
Extended European Search Report in Application 22158330.5, dated Jun. 9, 2022, 6 pages.

* cited by examiner

COMMAND CONFIRMATION FOR A MEDIA PLAYBACK DEVICE

CROSS REFERENCE TO RELATED APPLICATIONS

This application is a Continuation of U.S. patent application Ser. No. 15/973,173, filed 7 May 2018, which is hereby incorporated by reference in its entirety. To the extent appropriate, a claim of priority is made to the above disclosed application.

BACKGROUND

Many people enjoy consuming media content while traveling or during other activities. For example, many drivers and passengers listen to audio content, such as songs, albums, podcasts, audiobooks, and other types of audible content, while traveling in vehicles. Typical sources of such audio content in vehicles include radios and fixed media, such as CDs, USBs, and SD cards. Media content from such typical sources are not flexible or personalized for the listeners in vehicles. Some cars are equipped with built-in streaming audio systems, but limited user interfaces can make such systems difficult to use. A few recent car models have more advanced entertainment systems, but have yet to be widely used.

This nearly limitless access to media content introduces new challenges for users. For example, some studies show that, while in-car voice commands allow the driver to keep their eyes on the road, they can still detract the driver. Users often expect immediate feedback after interacting with a media playback device. When a user does not receive immediate feedback, they may become distracted when waiting for a response from the media playback device. The cognitive load is still significantly required when interacting with the media playback device interfaces and the voice command systems.

SUMMARY

In general terms, the present disclosure is directed to a system and method for voice control of a media playback device. In some embodiments, and by non-limiting example, the system provides a command confirmation. In some embodiments, the command confirmation is provided when various aspects are described in this disclosure, which include, but are not limited to, the following aspects.

One aspect is a method for operating a voice command interface configured to control a media playback device. The method includes receiving an instruction from a user, the instruction is indicative of a user command requesting an outcome, determining whether the outcome is recognizable by the user of the media playback device in a predetermined period of time after receiving the instruction; and upon determining that the outcome is not recognizable by the user of the media playback device in the predetermined period of time, playing an audio cue before the predetermined period of time elapses.

Another aspect is a system for operating a voice command interface configured to control a media playback device. The system includes a sound processing engine and a command processing engine. The sound processing engine is configured to receive an instruction from a user, the instruction is indicative of a user command requesting an outcome; determine whether the outcome is recognizable by the user of the media playback device in a predetermined period of time after receiving the instruction; and upon determining that the outcome is not recognizable by the user of the media playback device in the predetermined period of time, playing an audio cue before the predetermined period of time elapses.

DETAILED DESCRIPTION

Figure 1:
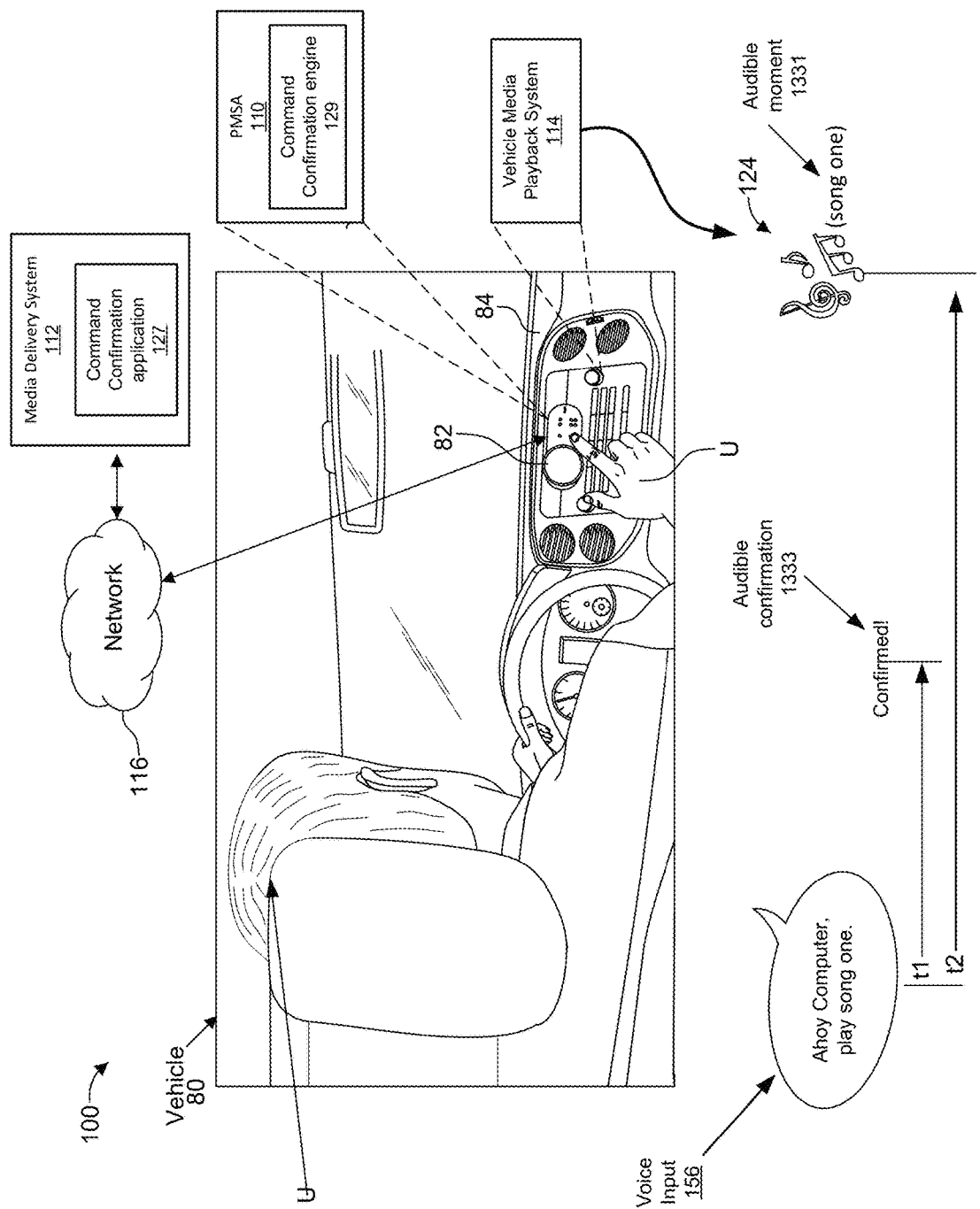
FIG. 1 illustrates a system for streaming media content for playback in accordance with an exemplary embodiment of the present disclosure.

Various embodiments will be described in detail with reference to the drawings, wherein like reference numerals represent like parts and assemblies throughout the several views.

People spend a significant amount of time traveling in vehicles. Many of them find that time to be more enjoyable when they are listening to music, watching videos, or otherwise consuming media content. Media content includes audio and video content. Examples of audio content include songs, albums, playlists, radio stations, podcasts, audiobooks, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in as a passenger for traveling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to safely interact with a media playback device without disrupting the driving or navigating. Further, the user interface of a media playback device built in a vehicle, or the user interface of a media playback device separately provided and used in a vehicle, typically provides control elements (e.g., physical buttons and knobs, or graphical icons and buttons) that are not easy to identify, navigate, and control while the vehicle is in operation. While some devices provide voice-based user interfaces, such interfaces encounter significant challenges to use in a vehicle environment. The passenger areas of a vehicle are often noisy due to engine noise, road noise, and any currently-playing media content items. This noise hampers the ability of a user to interact with the voice-based user interface. Moreover, accessing media content while traveling may be difficult, expensive, or impossible depending on network availability or capacity along the route of travel. Further, accessing and playing media content can require significant amounts of electric power. Thus, when a mobile device is used for media content playback, draining a battery can be a challenge for a longer travel and a longer use of the mobile device without recharging. It can also be challenging to connect a media playback device to a vehicle built-in audio system for playback while traveling in a vehicle. Embodiments disclosed herein address some or all of these challenges. It should be understood, however, that various aspects described herein are not limited to use a media playback device during travel.

Many vehicles include a built-in media playback device, such as a radio or a fixed media player, such as a player that can play media content from a CD, USB driver, or SD cards. However, the media content that is delivered using these built-in vehicle media playback devices is greatly limited and is not flexible or customizable to the user.

Alternatively, a mobile device, such as a smartphone and a tablet, is typically used by a user to enjoy a personalized and flexible music consuming experience in a vehicle by running music streaming applications thereon. However, mobile devices are not well suited for a vehicle environment for various reasons. For example, mobile devices are not readily retrievable or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions (e.g., safety restrictions while driving) are further drawbacks to using mobile devices for playing media content in the vehicle.

To address these challenges, the present disclosure provides a special-purpose personal appliance for streaming media in a vehicle. The appliance is also referred to herein as the personal media streaming appliance (PMSA), the smart vehicle media appliance (SVMA), the personal vehicle media streaming appliance (PVMSA), or the like. The appliance is specially designed to be dedicated for media streaming purposes in a vehicle, and there is no other general use. Some embodiments of the appliance can operate to communicate directly with a media content server and receive the streaming of media content from the server via a cellular network. In these embodiments, other computing devices, such mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to a mobile device that provides a mobile hotspot to enable the appliance to communicate with the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port or Bluetooth®. Therefore, the media content streamed to the appliance can then be transmitted from the appliance to the vehicle audio system for playback in the vehicle.

In some embodiments, the appliance can include a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omni-directional noise cancellation is applied in some embodiments to reduce omni-directional sound (e.g., vehicle noise). Directional noise is detected by determining a difference between audio input detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

In addition, the personal vehicle media streaming appliance can provide various features that enable a quality voice interaction in a vehicle. In some embodiments, the personal vehicle media streaming appliance includes multiple microphones arranged to resist the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omni-directional noise cancellation is applied to reduce omni-directional sound (e.g., vehicle noise). Directional noise is detected by determining a difference between audio input detected by the two microphones facing the passenger area. The difference is preserved as directional audio input. The appliance further cancels out the audio that it is providing for playback, allowing a user to provide voice commands without needing to shout over loud music, for instance. In this manner, the appliance is arranged to provide an improved voice-based interface in a vehicle environment.

The voice command systems present verbal notifications and interact with the drivers to receive their voice commands. For example, the voice command systems can receive a driver's voice command and present a verbal response (in the form of voice messaging) to the driver to confirm that the driver's voice command is received. Such verbal feedback can still impose a certain level of cognitive load on the drivers because it requires the drivers to recognize and understand the meaning of the verbal response. Therefore, in certain situations, verbal feedback in response to the driver's voice command is not desirable. For example, when the driver wants to focus on driving on certain traffic conditions (e.g., driving on a ramp, changing lanes, driving in heavy traffic, under severe weather, etc.), even short verbal notifications and feedbacks can significantly distract the driver. The media playback device may be capable of determining the travel conditions of the vehicle, determining whether the travel conditions satisfy verbal feedback activation criteria, and upon determining that the travel condition satisfies the verbal feedback activation criteria, presenting a verbal feedback in replacement of the audio cue.

Further, the present disclosure generally relates to a system and method for providing an audio cue to a user that confirms that the user's voice command has been received. Therefore, the user does not have to wonder if the user's command has been properly entered. Then, the user can wait without worry until the outcome responsive to the voice command is played. The audio cue feedback is especially helpful when the outcome will take some time to be played back to the user, or to be recognized by the user, in response to the user command. By way of example, if the user voice-commands to play a song and the song is very quiet and slow at the beginning, the song may not be immediately recognized by the user when the song is first played back. In this situation, before the user realizes that the song is being played back, the audio cue can be played to confirm that the user's voice command has been registered and the song will be (or is currently being) played. It should be appreciated that various types of media context may be played, including, but not limited to, podcasts, audiobooks, news, videos, etc.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, traveling (and in particular driving) in a vehicle is described as an example of an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices configured to play media content, such as a personal media streaming appliance (PMSA) 110, a media delivery system 112, a vehicle media playback system 114, and a mobile computing device (not shown). The system 100 further includes a data communication network 116 and an in-vehicle wireless data communication network (not shown).

The PMSA 110 operates to receive media content that is provided (e.g., streamed, transmitted, etc.) by a system external to the PMSA 110, such as the media delivery system 112, and transmit the media content to the vehicle media playback system 114 for playback. In some embodiments, the PMSA 110 is a portable device, which can be carried into and used in the vehicle 80. The PMSA 110 can be mounted to a structure of the vehicle 80, such as the dashboard 82 or the head unit 84. In other embodiments, the PMSA 110 can be configured to be built in a structure of the vehicle 80. An example of the PMSA 110 is illustrated and described in more detail with reference to FIGS. 2 and 6.

The media delivery system 112 operates to provide media content to one or more media playback devices 104 via the network 116. In the illustrated example, the media delivery system 112 provides media content to the PMSA 110 for playback of media content using the vehicle media playback system 114. An example of the media delivery system 112 is illustrated and described in further detail herein, such as with reference to FIG. 3.

The media delivery system 112 comprises a command confirmation application 127, which functions to verify how quickly the command is received and an output can be produced, and is illustrated and described in more detail with reference to FIGS. 3 and 8. The PMSA 110 comprises a command confirmation engine 129 which functions to verify how quickly the command is received and an output can be produced, and is described in more detail with reference to FIGS. 2 and 7.

Once a command is confirmed, an audible confirmation 1333 is produced if the desired output is not produced within a predetermined period of time. If the command is confirmed and the desired output is produced within the predetermined period of time, then an audible moment 1331 is produced. Alternatively, a confirmation may be a tactile feedback. For ease of explanation, the embodiments described in this application are presented using an audible confirmation 1333; however, it should be noted that a tactile feedback might be provided instead of the audible confirmation or in addition to.

The vehicle media playback system 114 operates to receive media content from the PMSA 110 and generates a media output 124 to play the media content in the vehicle 80. The vehicle media playback system 114 may include an audio feedback engine 342. An example of the vehicle media playback system 114 is further described and illustrated herein including the description with reference to FIG. 4.

The PMSA 110 operates to receive information via multiple inputs, for example, voice input 156 from a user U. In an example, a user U speaks an instruction (or voice command) that is recognized and analyzed, and the PMSA 110 generates an output. An output may include the vehicle media playback system 114 playing an audio cue or playing preset one. An output may also be a variety of actions such as adding a media context item to a preset, playing the next media context item, creating an alias for preset one, etc.

The network 116 is a data communication network that facilitates data communication between the PMSA 110 and the media delivery system 112. In some embodiments, the mobile computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth®, ultra-wideband (UWB), 802.11, Zig-Bee, and other types of wireless links. Furthermore, in various embodiments, the network 116 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the mobile computing device 118) and the media delivery system 112. Because the network 116 is configured primarily for data communication between computing devices in the vehicle 80 and computing devices outside the vehicle 102, the network 116 is also referred to herein as an out-vehicle network or out-vehicle data communication.

Unlike the network 116, the in-vehicle wireless data communication 122 can be used for data communication between computing devices (e.g., the media playback devices 104) in the vehicle. In the illustrated example, the in-vehicle wireless data communication 122 is used between the PMSA 110 and the mobile computing device 118. In other embodiments, the in-vehicle wireless data communication 122 can also be used for data communication between the PMSA 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes WiFi® technology. In yet other embodiments, other suitable wireless communication interfaces can be used for the in-vehicle wireless data communication 122, such as near field communication (NFC) and an ultrasonic data transmission.

In some embodiments, a mobile computing device (not shown) is configured to play media content independently from the PMSA 110. In some embodiments, the mobile computing device is a standalone computing device that, without the PMSA 110 involved, can communicate with the media delivery system 112 and receive media content from the media delivery system 112 for playback in the vehicle 80. An example of the mobile computing device 118 is illustrated and described in further detail herein, such as with reference to FIG. 5.

Figure 2:
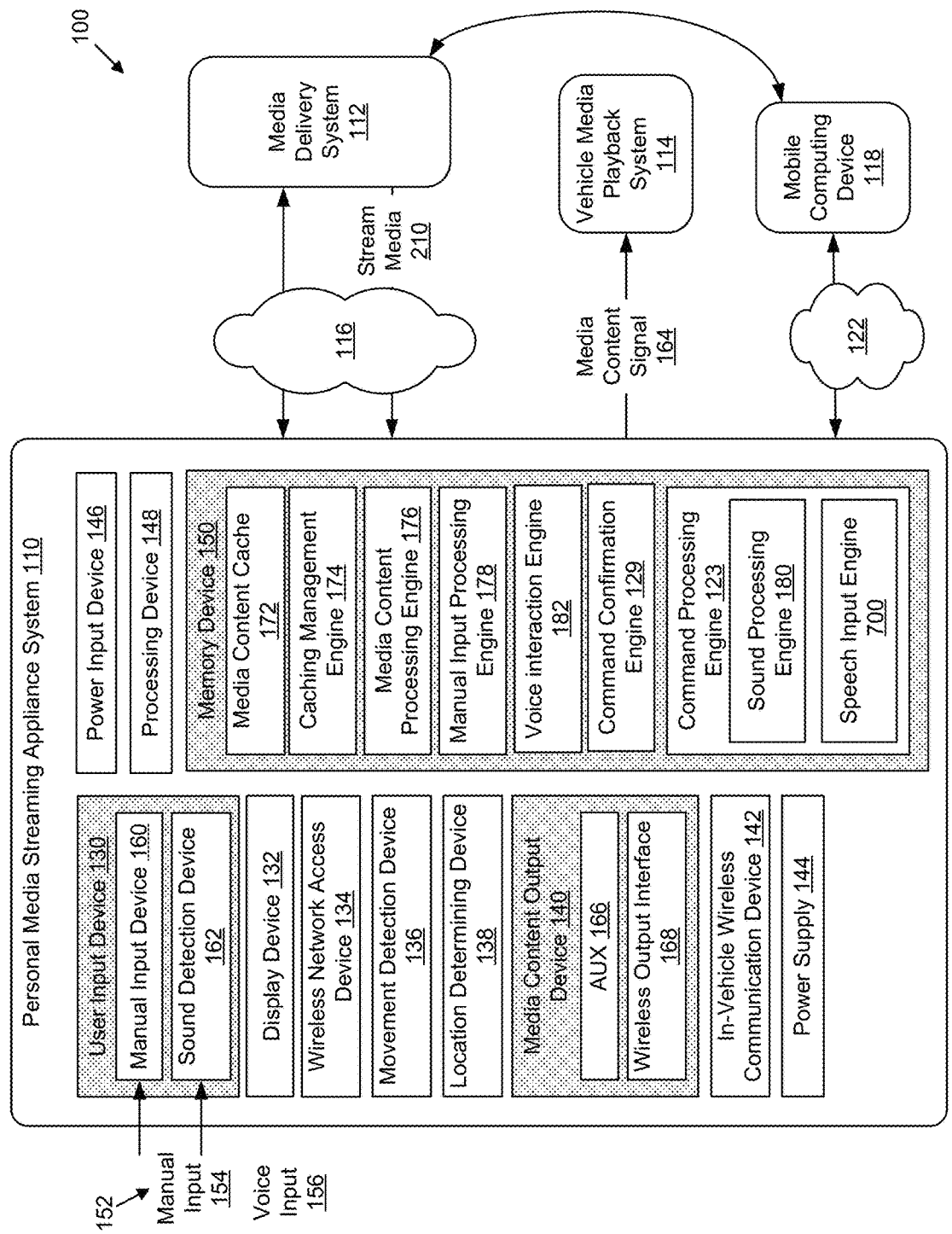
FIG. 2 is a block diagram of an exemplary embodiment of a personal media streaming appliance (PMSA) system.

FIG. 2 is a block diagram of an example embodiment of the PMSA 110 of the media streaming system 100 shown in FIG. 1. In this example, the PMSA 110 includes a user input device 130, a display device 132, a wireless network access device 134, a movement detection device 136, a location determining device 138, a media content output device 140, an in-vehicle wireless communication device 142, a power supply 144, a power input device 146, a processing device 148, and a memory device 150.

In some embodiments, the PMSA 110 is a system dedicated for streaming personalized media content in a vehicle environment. At least some embodiments of the PMSA 110 have limited functionalities specific for streaming media content from the media delivery system 112 at least via the network 116 and/or for providing other services associated with the media content streaming service. The PMSA 110 may have no other general use such as found in other computing devices, such as smartphones, tablets, and other smart devices. For example, when the PMSA 110 is powered up, the PMSA 110 is configured to automatically activate, restart, or resume a software application that is configured to perform the media content streaming operation dedicated for the PMSA 110 by operating at least one of the components, devices, and elements of the PMSA 110. In some embodiments, the software application of the PMSA 110 is configured to continue running until the PMSA 110 is powered off or powered down to a predetermined level. The PMSA 110 is configured to be free of any user interface control that would allow a user to disable the activation of the software application on the PMSA 110.

As described herein, the PMSA 110 provides various structures, features, and functions that improve the user experience of consuming media content in a vehicle.

As illustrated, the PMSA 110 can communicate with the media delivery system 112 to receive media content via the network 116 and enable the vehicle media playback system 114 to play an audio cue or the media content in the vehicle. In some embodiments, the PMSA 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA 110. In addition, in some embodiments, the manual input 154 is received for managing various pieces of information transmitted via the PMSA 110 and/or controlling other functions or aspects associated with the PMSA 110.

In some embodiments, the manual input device 160 includes one or more manual control elements configured to receive various manual control actions, such as pressing actions and rotational actions. As described herein, the manual input device 160 includes a manual control knob 510 and one or more physical buttons 512, which is further described and illustrated with reference to FIG. 6.

The sound detection device 162 operates to detect and record sounds proximate the PMSA 110. For example, the sound detection device 162 can detect sounds including the voice input 156 (also referred to herein as an instruction). In some embodiments, the sound detection device 162 includes one or more acoustic sensors configured to detect sounds proximate the PMSA 110. For example, acoustic sensors of the sound detection device 162 include one or more microphones. Various types of microphones can be used for the sound detection device 162 of the PMSA 110.

In some embodiments, the voice input 156 is a user's instruction for controlling playback of media content via the PMSA 110. In addition, the voice input 156 is a user's voice for managing various data transmitted via the PMSA 110 and/or controlling other functions or aspects associated with the PMSA 110. Voice inputs 156 can function similar to manual inputs 154 to control the PMSA 110.

In some embodiments, the sound detection device 162 is configured to cancel noises from the received sounds so that a desired sound (e.g., the voice input 156) is clearly identified. For example, the sound detection device 162 can include one or more noise-canceling microphones that are configured to filter ambient noise from the voice input 156. In addition or alternatively, a plurality of microphones of the sound detection device 162 is arranged at different locations in a body of the PMSA 110 and/or oriented in different directions with respect to the body of the PMSA 110, so that ambient noise is effectively canceled from the voice input 156 or other desired sounds being identified.

In some embodiments, the sounds detected by the sound detection device 162 can be processed by the sound processing engine 180 of the PMSA 110 as described below.

Referring still to FIG. 2, the display device 132 operates to display various pieces of information to the user U. Examples of such information include playback information of media content, notifications, and other information.

In some embodiments, the display device 132 operates as a display screen only and is not capable of receiving a user input. By receiving the manual input 154 only via the manual input device 160 and disabling receipt of the manual input 154 via the display device 132, the user interface of the PMSA 110 is simplified so that the user U can safely control the PMSA 110 without significant distraction in the vehicle 102. It is understood however that, in other embodiments, the display device 132 is configured as a touch-sensitive display screen that operates as both a display screen and a user input device. In yet other embodiments, the PMSA 110 does not include a display device.

As described herein, in some embodiments, the display device 132 is arranged at the manual input device 160. In other embodiments, the display device 132 is arranged separate to the manual input device 160.

In an example embodiment, audible confirmation 1333 may be played at the same time as a visual animation is shown on the display device 132. Showing the visual animation at the same time as the audible confirmation 1333 trains a user as to what the audible confirmation 1333 means. The visual animation and audible confirmation 1333 may always be presented at the same time. Alternatively, the visual animations are not presented after a predetermined period of time and only the audible confirmation 1333 is presented.

The wireless data communication device 134 operates to enable the PMSA 110 to communicate with one or more computing devices at a remote location that is outside the vehicle 80. In the illustrated example, the wireless data communication device 134 operates to connect the PMSA 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types, which connects the PMSA 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In the some embodiments, the wireless data communication device 134 is configured as a cellular network interface to facilitate data communication between the PMSA 110 and the media delivery system 112 over cellular network.

The movement detection device 136 can be used to detect movement of the vehicle 102. In some embodiments, the movement detection device 136 is configured to monitor one or more factors that are used to determine movement of the vehicle 102. The movement detection device 136 can include one or more sensors that are configured to detect movement, position, and/or orientation of the PMSA 110. As an example, the movement detection device 136 may determine an orientation of the PMSA 110 with respect to a primary direction of gravitational acceleration. The movement detection device 136 may detect changes in the determined orientation and interpret those changes as indicating movement of the PMSA 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The media content output device 140 is an interface that enables the PMSA 110 to transmit media content to the vehicle media playback system 114. Some embodiments of the PMSA 110 do not have a speaker and thus cannot play media content independently. In these embodiments, the PMSA 110 is not regarded as a standalone device for playing media content. Instead, the PMSA 110 transmits media content to another media playback device, such as the vehicle media playback system 114 to enable the other media playback device to play the media content, such as through the vehicle stereo system.

As illustrated, the PMSA 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

Figure 6:
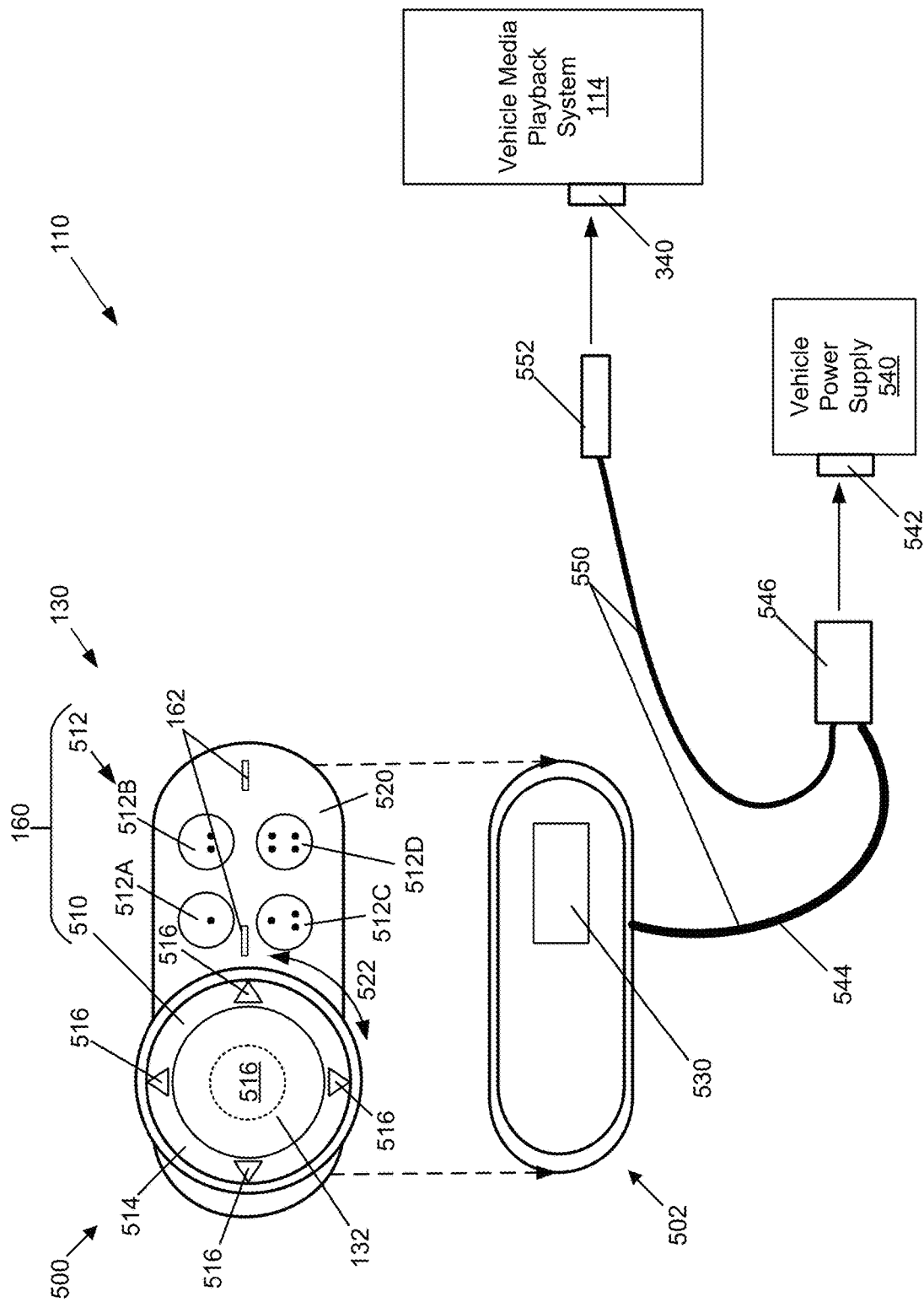
FIG. 6 schematically illustrates an exemplary embodiment of the PMSA.

The AUX output interface 166 is configured to connect the PMSA 110 to the vehicle media playback system 114 via a cable (e.g., a media content output line 550 in FIG. 6) of the PMSA 110. In some embodiments, as illustrated in FIG. 6, the media content output line 550 extending from the PMSA 110 is connected to an input connector 340 (e.g., an auxiliary input jack or port) of the vehicle media playback system 114. As illustrated herein, the media content output line 550 can be of various types, such as an analog audio cable or a USB cable.

The wireless output interface 168 is configured to connect the PMSA 110 to the vehicle media playback system 114 via a wireless communication protocol. In some embodiments, the wireless output interface 168 is configured for Bluetooth® connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA 110 to communicate with other computing devices, such as the mobile computing device 118, in the vehicle 80. Various types of wireless communication interfaces can be used for the in-vehicle wireless communication device 142, such as Bluetooth®, WiFi® technology, a near field communication (NFC), and an ultrasound data transmission. The in-vehicle wireless communication is also referred to herein as a short-range wireless communication.

The power supply 144 is included in the example PMSA 110 and is configured to supply electric power to the PMSA 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA 110 and is not removable from the PMSA 110. In other embodiments, the power supply 144 is removable by the user from the PMSA 110.

The power input device 146 is configured to receive electric power to maintain activation of components of the PMSA 110. As described herein, the power input device 146 is connected to a power source of the vehicle 80 (e.g., a vehicle power supply 540 in FIG. 6) and uses the electric power from the vehicle 80 as a primary power source to maintain activation of the PMSA 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the PMSA 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a command processing engine 123 comprising a sound processing engine 180, and a speech input engine 700. In an example, and as described in more detail with reference to FIGS. 7-8, the speech input engine 700 includes a speech trigger activation engine 702, a speech recognition engine 704, and a speech analysis engine 706. However, the speech input engine 700 need not contain all the engines, as they may be located at the media delivery system.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., command or instruction) corresponding to the manual input 154 to the PMSA 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or cancelling technologies or passive noise control or cancelling technologies, can be used for filtering the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspects of the PMSA 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA 110 such as volume, dominant frequency or frequencies, etc. These sound properties may be used to make inferences about the environment proximate to the PMSA 110.

Figure 3:
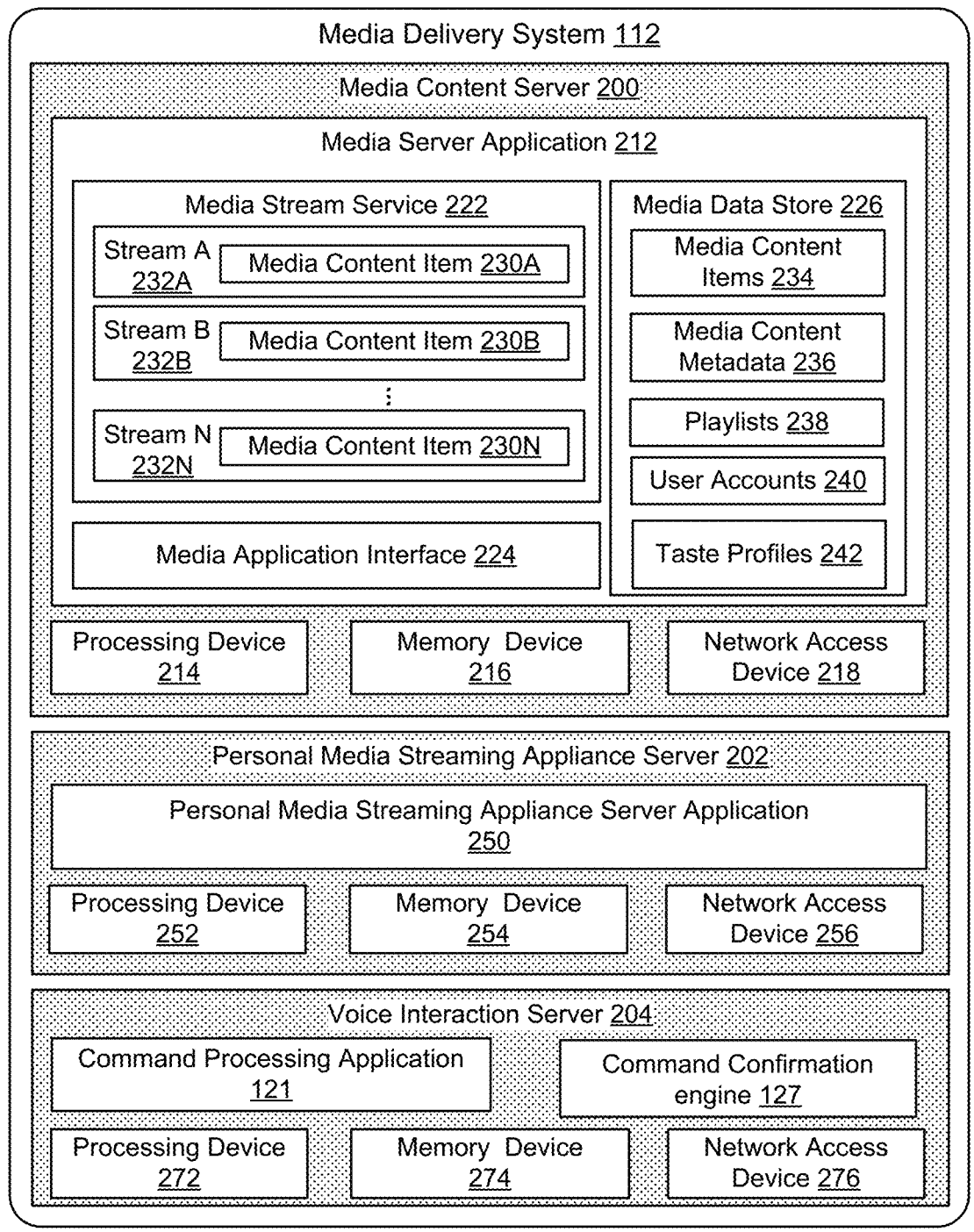
FIG. 3 is a block diagram of an exemplary embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

Figure 7:
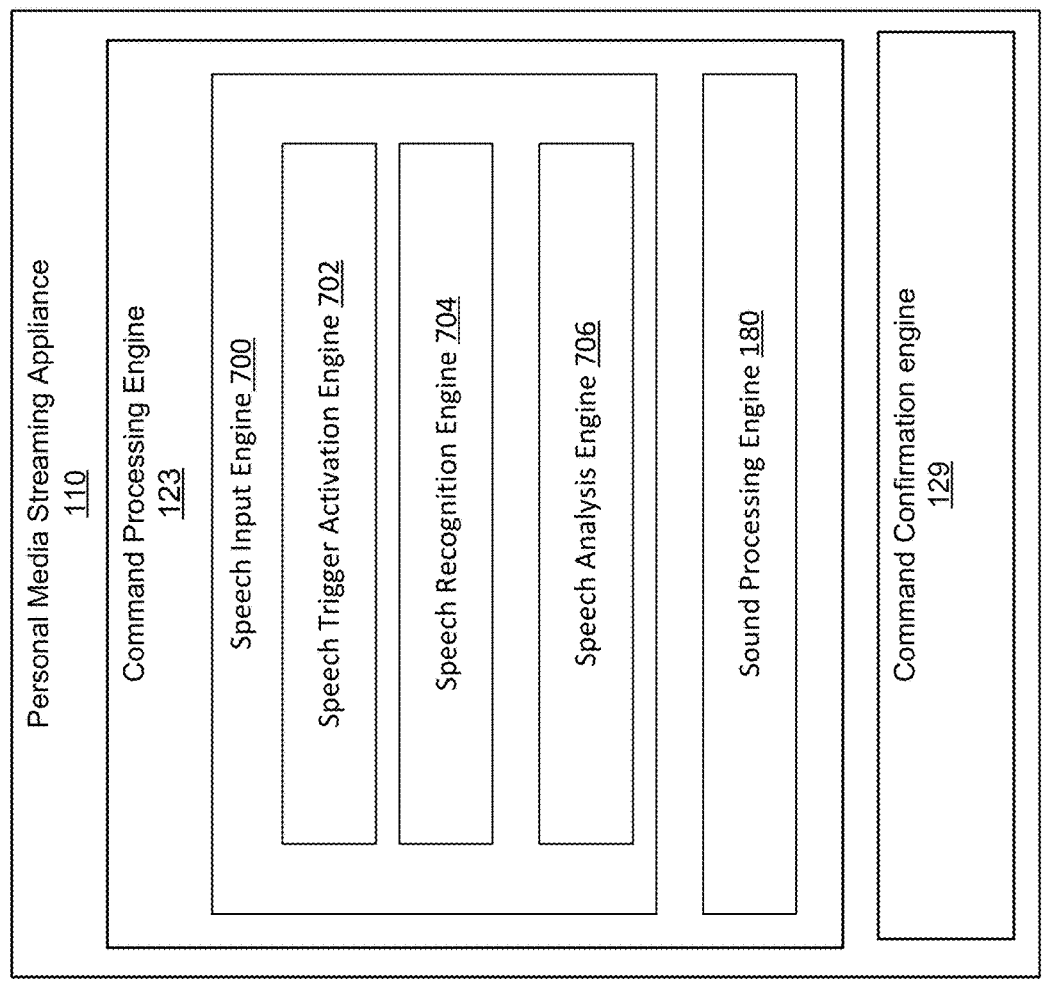
FIG. 7 is a block diagram of an exemplary embodiment of a personal media streaming appliance server application.
Figure 8:
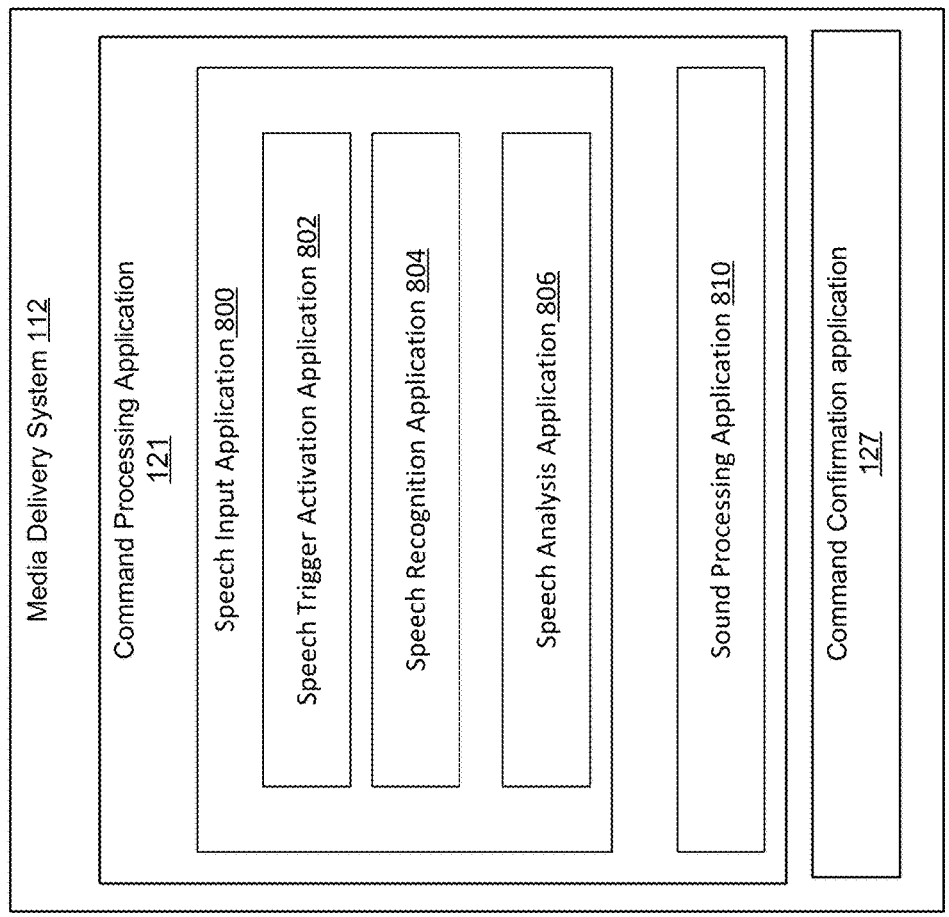
FIG. 8 is a block diagram of an exemplary embodiment of a voice interaction server application.

In some embodiments, after the sound processing engine 180 captures a recording of sounds, the speech input engine 700 parses the sounds into segments recognizable by the speech trigger activation engine 702, speech recognition engine 704, and speech analysis engine 706, as described in further detail at FIGS. 7-8. The instruction (voice input) may be analyzed using natural language processing and/or intent recognition technology to convert the instruction to text and determine appropriate actions to take based on the spoken words. In other embodiments, not all of the functions of the speech input engine 700 are performed by the PMSA 110, and instead the media delivery system 112 may perform some of the functions. Allowing engines to be located on the media delivery system 112 reduces costs associated with producing a PMSA 110. For example, the PMSA 110 reduces the processing power needed in the PMSA 110.

Command confirmation engine 129 functions to receive an instruction that includes a command and determine whether the output meets an audible threshold within a predetermined time. When a user utters a command, the command processing engine 123 processes the command and sends the command to the command confirmation engine 129. The command confirmation engine 129 determines whether to first play an audible confirmation or whether to play the desired command outright. An audible confirmation may be played when the command itself is not loud enough quickly enough to notify the user that the command has been received and processed. Conversely, if the desired outcome plays loud enough quickly enough, then no additional audible confirmation is played.

The command confirmation engine 129 also determines whether or not a desired outcome is generally associated with an audible output. For example, a user may utter a command to add a song to a play. Since no audible output is generally associated with such a command, the command confirmation engine 129 processes to produce an audible confirmation 1333.

The command confirmation engine 129 may play an audible confirmation 1333, regardless of how quickly or loudly the desired outcome is played. The audible confirmation 1333 plays every time a command is received. The time in which an audible confirmation 1333 plays is immediately, such as within two seconds. In an embodiment, the audible confirmation 1333 is the same audio cue, while in other embodiments, the audible confirmation 1333 is a different audio cue depending on the command received.

The command processing engine 123 operates to interact with the PMSA 110 and enable the PMSA 110 to perform various voice-related functions, such as voice feedback and voice notifications. In some embodiments, the speech input engine 700 is configured to receive data (e.g., speech-to-text (STT) data) representative of a voice input received via the PMSA 110 and process the data to determine a user command (e.g., a user request or instruction). In some embodiments, at least one of the media content server 200, the PMSA server 202, and the voice interaction server 204 may be used to perform one or more functions corresponding to the determined user command.

FIG. 3 is a block diagram of an exemplary embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA 110 and, in some embodiments, other media playback devices, such as the mobile computing device 118, as well. In addition, the media delivery system 112 interacts with the PMSA 110 to provide the PMSA 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA servers, and multiple voice interaction servers may be identical or similar to the media content server 200, the PMSA server 202, and the voice interaction server 204, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 116. Examples of the network access device 218 include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA 110, to retrieve media content items from the media content server 200. For example, in FIG. 2, the media application interface receives communication from the PMSA 110, such as the caching management engine 174 thereof, to receive media content from the media content server 200.

In some embodiments, the media data store 226 stores media content items 234, media content metadata 236, playlists 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provide various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track refers to a numerical or mathematical representation of the sound of a track. Acoustic metadata may include temporal information such as tempo, rhythm, beats, downbeats, tatums, patterns, sections, or other structures.

Referring still to FIG. 3, each of the playlists 238 is used to identify one or more media content items 234. In some embodiments, the playlists 238 are configured to group one or more media content items 234 and provide a particular context to the group of media content items 234. Some examples of the playlists 238 include albums, artists, playlists, and individual media content items. By way of example, where a playlist 238 is an album, the playlist 238 can represent that the media content items 234 identified by the playlist 238 are associated with that album.

As described above, the media contexts 234 can include playlists 238. The playlists 238 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, a user can listen to media content items in a playlist 238 by selecting the playlist 238 via a media playback device 104, such as the PMSA 110. The media playback device 104 then operates to communicate with the media delivery system 112 so that the media delivery system 112 retrieves the media content items identified by the playlist 238 and transmits data for the media content items to the media playback device 104 for playback.

In some embodiments, the playlist 238 includes a playlist title and a list of content media item identifications. The playlist title is a title of the playlist, which can be provided by a user using the media playback device 104. The list of content media item identifications includes one or more media content item identifications (IDs) that refer to respective media content items 170.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 238 may include user-created playlists. For example, a user of a media streaming service provided using the media delivery system 112 could create a playlist 238 and edit the playlist 238 by adding, removing, and rearranging media content items in the playlist 238. A playlist 238 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 238 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA 110 and the mobile computing device 118) to log into the user account and access data associated with the user account in the media delivery system 112. User authentication information, such as a username, an email account information, a password, and other credentials, can be used for the user to log into his or her user account.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another exemplary use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another exemplary taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another exemplary use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 3, the PMSA server 202 operates to provide various functionalities to the PMSA 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA 110 and enable the PMSA 110 to perform various functions, such as receiving a user manual input, displaying information, providing notifications, performing power management, providing location-based services, and authenticating one or more users for the PMSA 110. The PMSA server application 250 can interact with other servers, such as the media content server 200 and the voice interaction server 204, to execute such functions.

Referring still to FIG. 3, the voice interaction server 204 operates to provide various voice-related functionalities to the PMSA 110. In some embodiments, the voice interaction server 204 includes a command processing application 121, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the command processing application 121 operates to interact with the PMSA 110 and enable the PMSA 110 to perform various voice-related functions, such as voice feedback and voice notifications. In some embodiments, the command processing application 121 is configured to receive data (e.g., speech-to-text (STT) data) representative of a voice input received via the PMSA 110 and process the data to determine a user command (e.g., a user request or instruction). In some embodiments, at least one of the media content server 200, the PMSA server 202, and the voice interaction server 204 may be used to perform one or more functions corresponding to the determined user command.

A voice interaction server 204 may be used to recognize a voice command and perform steps to carry out the voice command. For example, a user may say "Ahoy computer, play preset one." The voice interaction server 204 is configured to receive the voice communication and process it. In some embodiments, the voice interaction server 204 is configured to receive data (e.g., speech-to-text (STT) data) representative of a voice input received via the PMSA 110 and process the data to determine a user command (e.g., a user request or instruction). Various types of speech recognition technology may be used to convert speech to text, such as natural language understanding (NLU), automatic speech recognition (ASR), and speech to text (STT) technology.

The command processing application 121 may function similar to command processing engine 123 of the PMSA 110. In an embodiment, the command processing application 121 and the command processing engine 123 work together to receive an instruction, convert it to text, and produce an outcome. In a non-limiting example, the command processing application 121 performs all the functions to convert an instruction to text and sends an output to be carried out by the PMSA 110.

The command confirmation application 127 functions to receive an instruction that includes a command and determine whether the output meets an audible threshold within a predetermined time. When a user utters a command, the command processing engine 123 processes the command and sends the command to the command confirmation engine 129. The command confirmation engine 129 determines whether to first play an audible confirmation 1333 or whether to play the desired command outright. An audible confirmation may be played when the command itself is not loud enough quickly enough to notify the user that the command has been received and processed. Conversely, if the desired outcome plays loud enough quickly enough, then no additional audible confirmation is played.

The command confirmation application 127 also determines whether or not a desired outcome is generally associated with an audible output. For example, a user may utter a command to add a song to a play. Since no audible output is generally associated with such a command, the command confirmation engine 129 processes to produce an audible confirmation 1333.

The command confirmation application 127 may play an audible confirmation 1333, regardless of how quickly or loudly the desired outcome is played. The audible confirmation 1333 plays every time a command is received. The time in which an audible confirmation 1333 plays is immediately, such as within two seconds. In an embodiment, the audible confirmation 1333 is the same audio cue, while in other embodiments, the audible confirmation 1333 is a different audio cue depending on the command received.

The command confirmation application 127 and the command confirmation engine 129 can work independently of each other, where only one performs all the functions. Alternatively, the command confirmation application 127 and the command confirmation engine 129 can work together, where the combination of the command confirmation application 127 or the command confirmation engine 129 perform all the functions. For example, the command confirmation engine 129 may receive the command from the command processing engine 123, and the command confirmation application 127 determines whether the output meets the threshold and determines whether to play an audible confirmation 1333.

Figure 4:
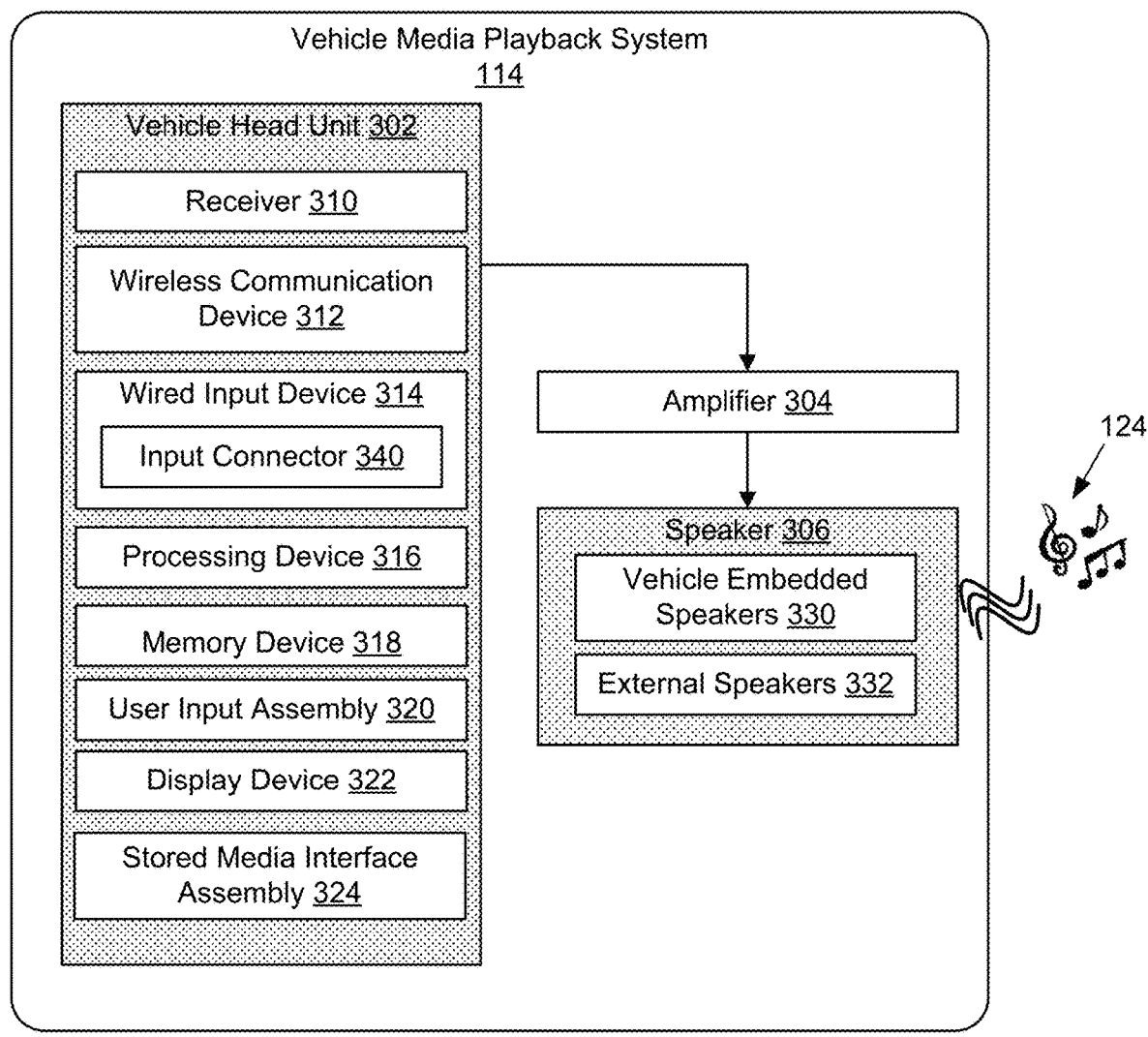
FIG. 4 is a block diagram of an exemplary embodiment of a vehicle media playback system.

FIG. 4 is a block diagram of an exemplary embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 114. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth® transceiver and a WiFi® transceiver. The wireless data signal may comprise a media content signal such as an audio or video signal. In some embodiments, the wireless communication device 312 is used to enable the vehicle media playback system 114 to wirelessly communicate with the PMSA 110 and receive the media content signal 164 (FIG. 2) from the PMSA 110 via an in-vehicle wireless network. The in-vehicle wireless network between the PMSA 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, DVI). In some embodiments, the wired input device 314 is also used to receive instructions from other devices.

In some embodiments, the wired input device 314 provides the input connector 340 (e.g., an AUX port) for receiving a connector 552 extending from the PMSA 110, as illustrated in FIG. 6. The media content signal 164 is then transmitted from the PMSA 110 to the vehicle media playback system 114 via the output line 550 (e.g., a cable), the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The memory device 318 also includes an audio feedback engine. The audio feedback engine 342 is capable of determining whether a user's desired command reaches a predetermined threshold. A predetermined threshold is measured as the speed and volume at which a user expects feedback from the PMSA 110. Users generally expect a quick response time when issuing a command to the PMSA 110. If no feedback is perceived by the user immediately, the user may believe that the PMSA 110 did not receive the command. However, if a user receives a quick feedback, regardless of whether it is the actual command, the user can be assured the command was received and is at least being processed.

In an embodiment, when the command meets the threshold, the audio feedback engine 342 sends a signal to the speaker 306 to play the command. For example, the user's instruction may include the command to play preset one. If the media context items associated with preset one starts quick enough and is loud enough, then the media context item is played. However, if the audio feedback engine 342 determines that the media context items associated with preset one is not loud enough to indicate to a user that the PMSA 110 has received the command, then an audio cue will play instead. The audio cue represents to the user that the PMSA 110 has received the command and is processing the request. An audio cue may also be used in situations where there is not a sound associated with the command. For example, if a user's command is to add a playlist to a preset, then the audio feedback engine 342 plays an audio cue that notifies to the user that their request, to add a playlist to a preset, has been received and processed.

An example audio cue may be a non-verbal response or a verbal response. An example non-verbal response may be selected from a beep, signal, ding, or other similar sound. An example verbal response may be selected from a confirmatory response such as "confirmed," or a non-confirmatory response such as "not processed."

Instructions usable by a voice-based user interface need not include all three of these portions. For instance, a user may speak an analysis-type activation trigger (e.g., "ahoy computer"), wait for the PMSA 110 to provide a confirmation that it is listening, and then provide a command as part of a separate instruction (e.g., "what song were you just playing?"). In another example, a user may speak the instruction "hey computer, preset one", which includes an analysis-type activation trigger ("hey computer") and a parameter portion ("preset one"), but not a command portion. In an example, the PMSA 110 is configured to infer the presence of a command based on the parameters or a context in which the instruction was provided (e.g., using natural language processing).

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 102. Users may bring one or more external speakers 332 into the vehicle 102 and connect the external speakers 332 to the vehicle head unit 302 using a wired interface or a wireless interface. In some embodiments, the external speakers 332 can be connected to the vehicle head unit 302 using Bluetooth®. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
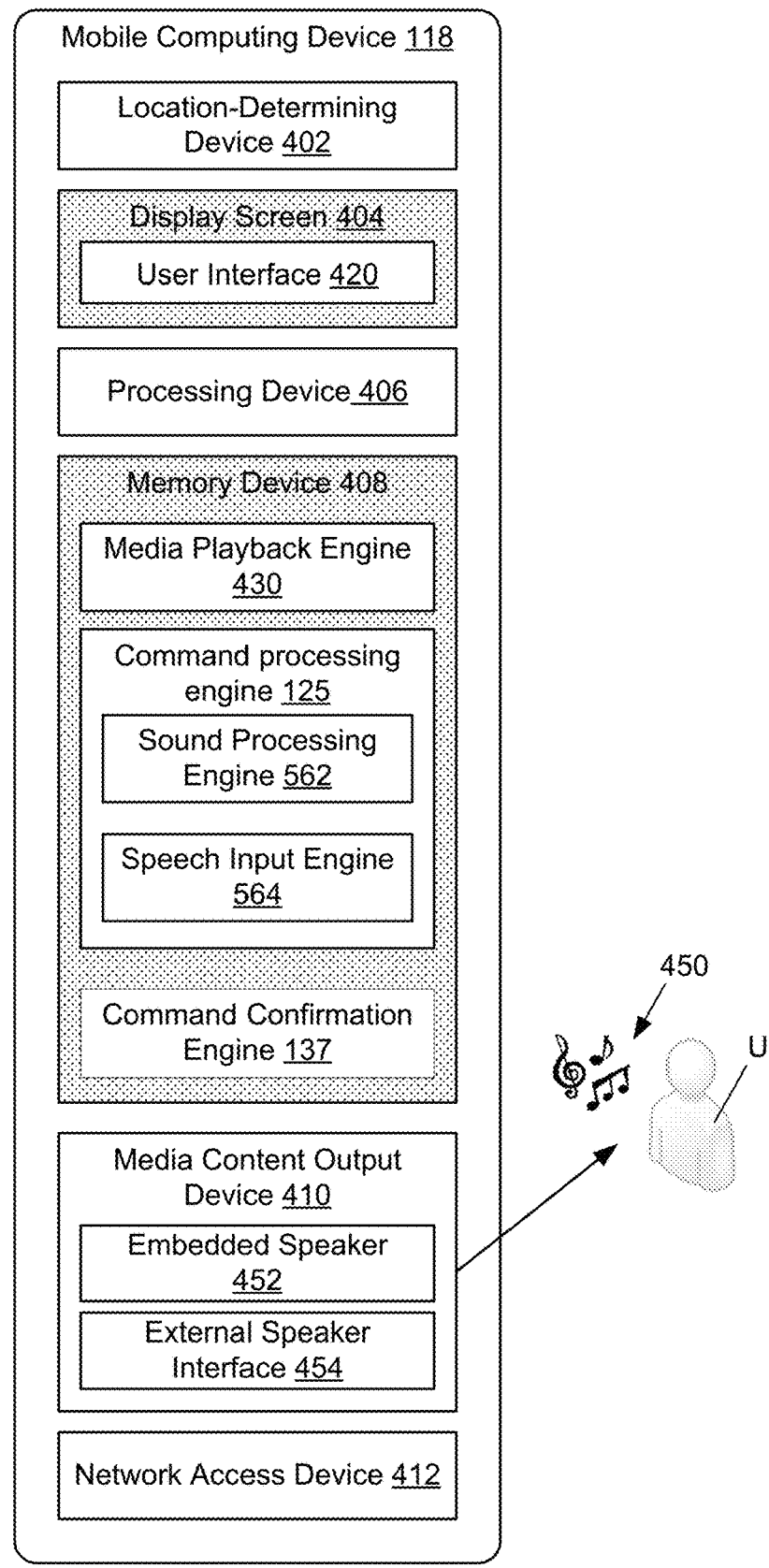
FIG. 5 is a block diagram of an exemplary embodiment of a mobile computing device.

FIG. 5 is a block diagram of an exemplary embodiment of the mobile computing device 118 of FIG. 2.

Similar to the PMSA 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA 110 in various aspects. For example, unlike the PMSA 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a media content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430. In yet other embodiments, the memory device 408 includes a command processing engine 125 that includes a sound processing engine 560 and a speech input engine 564.

The memory device 408 may be configured similarly to the memory device 150 (FIG. 2) and, therefore, the description of the memory device 408 is omitted for brevity purposes.

In some embodiments, the media playback engine 430 operates to retrieve one or more media content items that are either locally stored in the mobile computing device 118 or remotely stored in the media delivery system 112. In some embodiments, the media playback engine 430 is configured to send a request to the media delivery system 112 for media content items and receive information about such media content items for playback.

In embodiments the sound processing engine 560 is configured similarly to the sound processing engine 180 described with reference to FIG. 2, and, therefore, the description of the sound processing engine 560 is omitted for brevity purposes. It should be appreciated that in some embodiments, the sound processing engine 560 is omitted, and therefore the command processing application 121 located on the media delivery system 112 functions exclusively to process an instruction. In other embodiments, as described above, the command processing engine 125 works with the sound processing engine 180 of the media delivery system 112. For example, an instruction is received by the speech input engine 562 of the mobile computing device 118, and the speech input application 800 of the media delivery system 112 functions to analyze the instruction and provide a command back to the mobile computing device 118.

The command confirmation engine 137 functions to receive an instruction that includes a command and determine whether the output meets an audible threshold within a predetermined time. When a user utters a command, the command processing engine 123 processes the command and sends the command to the command confirmation engine 137. The command confirmation engine 137 determines whether to first play an audible confirmation or whether to play the desired command outright. An audible confirmation may be played when the command itself is not loud enough quickly enough to notify the user that the command has been received and processed. Conversely, if the desired outcome plays loud enough quickly enough, then no additional audible confirmation is played.

The command confirmation engine 137 also determines whether or not a desired outcome is generally associated with an audible output. For example, a user may utter a command to add a song to a playlist. Since no audible output is generally associated with such a command, the command confirmation engine 137 produces an audible confirmation 1333.

The command confirmation application 127, the command confirmation engine 129, and the command confirmation engine 137 can work independently of each other, where only one performs all the functions. Alternatively, the command confirmation application 127, the command confirmation engine 129, and the command confirmation engine 137 can work together, where the combination of the command confirmation application 127 or the command confirmation engine 129 or the command confirmation engine 137 perform all the functions. For example, the command confirmation engine 137 may receive the command from the command processing engine 123, and command confirmation application determines whether the output meets the threshold and determines whether to play an audible confirmation 1333.

Referring still to FIG. 5, the content output device 410 operates to output media content. In some embodiments, the content output device 410 generates a media output 450 for the user U. In some embodiments, the content output device 410 includes one or more embedded speakers 452, which are incorporated in the mobile computing device 118. Therefore, the mobile computing device 118 can be used as a stand-alone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth® transmitter, a display panel, and a video output jack. Other embodiments are possible as well. For example, the external speaker interface 454 is configured to transmit a signal through the audio output jack or Bluetooth® transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, Bluetooth® wireless technology, 802.11a/b/g/n/ac, and cellular or other radio frequency interfaces in at least some possible embodiments.

FIG. 6 schematically illustrates an exemplary embodiment of the PMSA 110 of FIG. 1. In this example, the PMSA 110 includes a personal media streaming appliance (PMSA) 500 and a docking device 502.

As described herein, the PMSA 110 is sized to be relatively small so that the PMSA 110 can be easily mounted to a structure (e.g., a dashboard or head unit) of the vehicle 102 where the user can conveniently manipulate the PMSA 110. By way of example, the PMSA 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA 110 in the vehicle 102 (FIG. 1).

The PMSA 110 is configured to include at least some of the devices of the PMSA 110 as illustrated with reference to FIG. 2. In some embodiments, the PMSA 500 includes all of the devices of the PMSA 110 as illustrated in FIG. 2.

As illustrated also in FIG. 2, some embodiments of the PMSA 500 include the user input device 130 that includes the manual input device 160 and the sound detection device 162. Some embodiments of the manual input device 160 include a control knob 510 and one or more physical buttons 512.

In some embodiments, the control knob 510 is configured to be maneuverable in multiple ways. For example, the control knob 510 provides a plurality of regions on a knob face 514 that are independently depressible upon receiving a user's pressing action against the knob face 514. In the illustrated example, the control knob 510 has five regions 516 (e.g., up, down, left, right, and middle) that are separately depressible. At least some of the regions 516 are configured to receive inputs of different user commands (e.g., requests or instructions).

In other embodiments, the control knob 510 is configured to be manipulated in different ways, such as tilting in multiple directions or sliding in multiple directions.

In addition, the control knob 510 is configured to be rotatable. For example, the user can hold the control knob 510 and rotate with respect to a body 520 of the PMSA 500. The control knob 510 can be rotatable in both directions 522 (e.g., clockwise and counterclockwise). In other embodiments, the control knob 510 is configured to rotate in only one direction.

The control knob 510 is used to receive user inputs for controlling playback of media content. In addition or alternatively, the control knob 510 can be used to receive user inputs for other purposes or functions.

The physical buttons 512 are configured to be depressed upon receiving a user's pressing action against the physical buttons 512. In the illustrated example, the PMSA 500 has four physical buttons 512A-512D. In some embodiments, each of the physical buttons 512 is configured to receive a single user command. In other embodiments, at least one of the physical buttons 512 is configured to receive multiple user commands.

In some embodiments, the physical buttons 512 are used as buttons that are preset to be associated with particular media content, thereby facilitating playback of such media content. In these embodiments, the physical buttons 512 are also referred to as preset buttons. These presets link to list of IDs stored in the media delivery system 112. In an example embodiment, there are four presets that correspond to four physical buttons 512, which are associated with a list of IDs on the media delivery system 112. Each preset contains multiple media content items, for example at least one playlist 238. In another embodiment, the media delivery system 112 stores more than four presets, herein referred to as shortcuts. Shortcuts are analogous to presets except that shortcuts do not correspond directly to a physical button 512. Shortcuts can be assessed through a voice command or with a mobile computing device.

In addition, the PMSA 500 also includes the display device 132. In some embodiments, the display device 132 is arranged at the knob face 514 of the control knob 510. As described herein, in some embodiments, the display device 132 does not include a touch sensitive display screen, and is configured as a display device only. In other embodiments, however, the display device 132 can be configured to be touch sensitive and receive a user input through the display device 132 as well.

Referring still to FIG. 6, the docking device 502 is configured to mount the PMSA 500 to a structure of the vehicle 102. The docking device 502 is configured to removeably mount the PMSA 500 thereto. The docking device 502 is further configured to attach to a structure of the vehicle 102 (FIG. 1) so that the PMSA 500 is positioned at the structure of the vehicle 102.

In some embodiments, an interface between the PMSA 500 and the docking device 502 is configured to prevent the PMSA 500 from rotating relative to the docking device 502 when the control knob 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

First, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

Second, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

Third, the electrical connection between the PMSA 500 and the docking device 502 can be used to detect connection between the PMSA 500 and the docking device 502.

FIG. 7 is a block diagram of an exemplary embodiment of the PMSA 110 of FIG. 2. In this example, the PMSA 110 includes a command processing engine 123 that includes a speech input engine 700 and a sound processing engine 180. The speech input engine 700 includes a speech trigger activation engine 702, a speech recognition engine 704, and a speech analysis engine 706. The speech input engine 700 functions to receive an instruction from a user and process it to produce a desired outcome. The speech input engine 700 parses an instruction from a user into three parts: a speech-analysis activation trigger portion, a command portion, and a parameter portion.

The speech trigger activation engine 702 receives the speech analysis activation trigger portion. For illustrative purposes, "ahoy computer" is used as the speech analysis activation trigger phrase, also referred to as a "wake" phrase. A wake phrase is used by the speech trigger activation engine 702 to notify to the PMSA 110 to continue listening to the user or to begin listening to the user. If an instruction is made by the user, but it does not start with the predetermined wake phrase, the PMSA 110 does not listen to the user and ignores any further instructions, until the wake phrase is said. This prevents the PMSA 110 from listening when a user is not attempting to issue a command.

Where user data is used, it can be handled according to a defined user privacy policy and can be used to the extent allowed by the user. Where the data of other users is used, it can be handled in an anonymized matter so the user does not learn of the details of other users generally or specifically.

In an alternative embodiment, a wake phrase is not required. Instead, a user may 'unlock' or use another type of 'wake signal' to activate the speech input engine 700. For example, a user may press a button on the PMSA 110, which has the same effect as saying a wake phrase.

After the wake phrase is processed, the speech recognition engine 704 identifies the command portion of the instruction. The command portion identifies intent of the user. For example, a user may say "ahoy computer, play preset one." The word "play" is identified as the command word, and the speech recognition engine 704 processes the request with regard to the next portion of the phrase as described below. Other command portions may include words such as "add," "skip," "delete," etc. In further embodiments, the speech recognition engine 704 may infer from an instruction, the user's intent, even if no command portion phrase is said.

The speech analysis engine 706 identifies the parameter portion of the instruction. The parameter portion identifies the portion of the instruction to which the command is applied. For example, in the phrase, "ahoy computer, play preset one," the last portion "present one" is the parameter portion. In an example, parameters may correspond to preset buttons 512 on the PMSA 110; however, parameters may additionally correspond to shortcuts.

In some embodiments, presets correspond to a physical button 512 on a PMSA 110. These presets link to list of IDs stored in the media delivery system 112. In an example embodiment, there are four presets that correspond to four physical buttons 512 on the PMSA 110, which are associated with a list of IDs on the media delivery system 112. Each preset contains multiple media content items, for example at least one playlist 238. In another embodiment, the cloud stores more than four presets, herein referred to as shortcuts. Shortcuts are analogous to presets except that shortcuts do not correspond to a button on the PMSA 110.

The sound processing engine 180 is described with reference to FIG. 2; therefore, for the sake of brevity the description is omitted.

In still a further example embodiment, the command processing engine 123 of the PMSA 110 may include the functionalities of the audio feedback engine of the vehicle media playback system 114. For the sake of brevity, the descriptions of the audio feedback engine 346 is omitted.

Still referring to FIG. 7, the command confirmation engine 129 determines whether an audible confirmation 1333 is needed, or whether playing the desired command on its own is sufficient to provide feedback to the user promptly.

The command confirmation engine 129 receives an instruction from a user that has been processed and determined to include a command. The command confirmation engine 129 determines whether the output meets both an audible threshold and can be produced within a predetermined time. The command confirmation engine 137 determines whether to first play an audible confirmation or whether to play the desired command outright. An audible confirmation may be played when the command itself is not loud enough quickly enough to signify to the user that the command has been received and processed. Conversely, if the desired outcome plays loud enough quickly enough, then no additional audible confirmation is played.

The command confirmation engine 129 also determines whether or not a desired outcome is generally associated with an audible output. For example, a user may utter a command to add a song to a play. Since no audible output is generally associated with such a command, the command confirmation engine 129 processes to produce an audible confirmation 1333.

The command confirmation engine 129 may play an audible confirmation 1333, regardless of how quickly or loudly the desired outcome is played. The audible confirmation 1333 may be played immediately, such as within two seconds of receiving the command. In an embodiment, the audible confirmation 1333 is the same audio cue, while in other embodiments, the audible confirmation 1333 is a different audio cue depending on the command received.

FIG. 8 is a block diagram of an exemplary embodiment of the command processing application 121 of the media delivery system 112. In this example, the command processing application 121 includes a sound processing application 810 and a speech input application 800. The speech input application 800 includes a speech trigger activation application 802, a speech recognition application 804, and a speech analysis application 806.

The speech trigger activation application 802, the speech recognition application 804, and the speech analysis application 806 of the command processing application 121 function similar to the speech trigger activation engine 702, a speech recognition engine 704, and a speech analysis engine 706 of the speech input engine 700 of the PMSA 110. For sake of brevity, the descriptions are omitted.

In example embodiments, the command processing engine 123 of the PMSA 110 works in conjunction with the command processing application 121 of the media delivery system 112 to convert an instruction to text and to analyze the instruction. Analogous engines/applications may only be located in a single location and therefore functions are not duplicated. Still further, each of the PMSA 110 and media delivery system 112 may both include all engines/applications.

In an example method, the speech trigger activation engine 702 of the PMSA 110 processes the wake signal, the speech recognition application 804 and speech analysis application 806 of the command processing application 121 process the command and parameter portion. In other embodiments, other combinations of the speech input engine 700 of the PMSA and the speech input application 800 of the media delivery system 112 may be utilized to process the instruction.

The sound processing application 810 functions similar to the sound processing engine 180 of the PMSA 110 as described with reference to FIG. 2. For the sake of brevity, the description of the sound processing engine 810 is omitted.

In still a further example embodiment, the command processing application 121 of the media delivery system 112 may include the functionalities of the audio feedback engine 346 of the vehicle media playback system 114. For the sake of brevity, the descriptions of the audio feedback engine 346 is omitted.

Still referring to FIG. 8, the command confirmation application 127 determines whether an audible confirmation 1333 is needed, or whether playing the desired command on its own is sufficient to provide feedback to the user promptly.

The command confirmation application 127 receives an instruction from a user that has been processed and determined to include a command. The command confirmation application 127 determines whether the output meets both an audible threshold and can be produced within a predetermined time. The command confirmation application 127 determines whether to first play an audible confirmation or whether to play the desired command outright. An audible confirmation may be played when the command itself is not loud enough quickly enough to signify to the user that the command has been received and processed. Conversely, if the desired outcome plays loud enough quickly enough, then no additional audible confirmation is played.

The command confirmation application 127 also determines whether or not a desired outcome is generally associated with an audible output. For example, a user may utter a command to add a song to a playlist. Since no audible output is generally associated with such a command, the command confirmation application 127 processes to produce an audible confirmation 1333.

The command confirmation application 127 may play an audible confirmation 1333, regardless of how quickly or loudly the desired outcome is played. The audible confirmation 1333 may be played immediately, such as within two seconds of receiving the command. In an embodiment, the audible confirmation 1333 is the same audio cue, while in other embodiments, the audible confirmation 1333 is a different audio cue depending on the command received.

The command confirmation application 127 of the media delivery system 112 and the command confirmation engine 129 of the PMSA 110 can work independently of each other, where only one performs all the functions. Alternatively, the command confirmation application 127 and the command confirmation engine 129 can work together, where the combination of the command confirmation application 127 or the command confirmation engine 129 perform all the functions. For example, the command confirmation engine 137 may receive the command from the command processing engine 123, and the command confirmation application 127 determines whether the output meets the threshold and determines whether to play an audible confirmation 1333.

Figure 9:
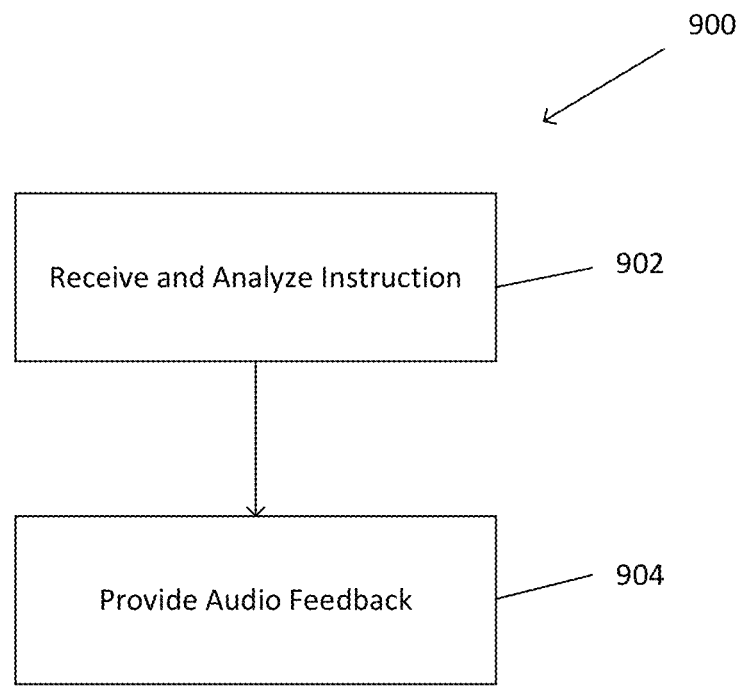
FIG. 9 schematically illustrates an example method as described herein.

FIG. 9 is a block diagram of a method 900 for receiving an instruction and processing the instruction to produce a desired output. A first step 902 includes receiving and analyzing an instruction. An instruction may be received and processed by either or both of the PMSA 110 and the media delivery system 112. The instruction is processed and when it is determined that a command must be processed, the command is sent to a command processing engine. A next step 904 includes providing audio feedback via a command confirmation engine 129 or a command confirmation application 127. Audio feedback may be an audible confirmation 1333 or the command itself. An audible confirmation 1333 is an audio cue and may be verbal, such as "track added" or non-verbal such as a beep, pulse, or other similar sound. Playing the command itself includes playing the audio track.

Audio cues may utilize different frequencies depending on the desire of the user. For example, different frequencies may provide different healing audio cues. A frequency of 741 Hz is associated with self-expression, which results in a pure and stable life. A frequency of 528 Hz is associated with transformation, which results in activating the user's imagination, intention, and intuition. A frequency of 417 Hz is associated with change, which results in encouraging the user to clear destructive influences of past events and allow the user to change their life. A frequency of 285 Hz is associated with energy fields, which results in rejuvenation and energization. A frequency of 174 Hz is associated with security, safety, and love, which results in reducing pain.

Figure 10:
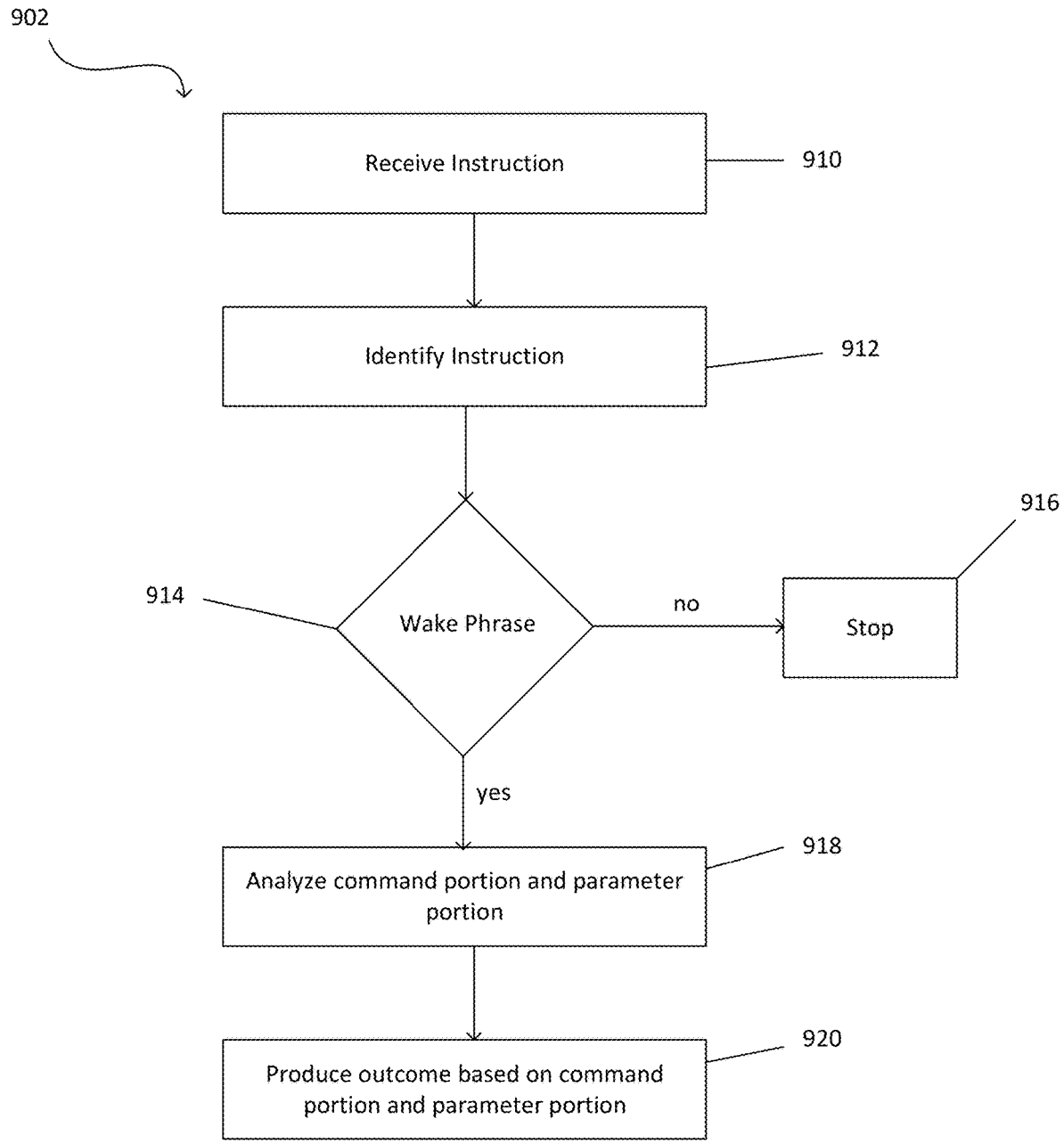
FIG. 10 schematically illustrates an exemplary method of receiving an instruction.

FIG. 10 illustrates an example method 902 of receiving and analyzing an instruction at a PMSA 110 and processing the instruction to produce a desired output. In a first step 910, an instruction is received. A user voices an instruction, which, in an example embodiment includes a wake phrase, a command portion, and a parameter portion. It should be noted, that an instruction could still be processed without including each of the wake phrase, command portion, and parameter portion. As described herein, a different wake signal may be used instead of a wake phrase, or a command portion may be inferred.

A next step 912 includes identifying the instruction. As explained above, the instruction is parsed into three portions. If the wake phrase is identified, step 914 includes having the PMSA 110 continue to listen to the instruction. At step 916, if the wake phrase is not identified, the method stops and the PMSA 110 stops listening to the instruction (or never listens to the instruction in the first place). For purposes of this illustration, the wake phrase is required to activate the PMSA 110 to continue listening to a user. It should be noted, that there are alternative embodiments that do not require a wake phrase as described above.

After the wake phrase is identified, step 918 includes identifying and analyzing the command portion and parameter portions. The speech trigger activation engine 702 or application 802 identifies and analyzes the wake phrase, the speech recognition engine 704 or application 804 analyzes the command portion, and the speech analysis engine 706 or application 806 analyze the parameter portion. The instruction is received and is converted from audio to text using one of a variety of methods. In an example embodiment, the instruction is converted to text by a third party server. A third party server may use methods such as natural language understanding, speech to text, and other similar methods to convert the audio to a text format.

Final step 920 includes producing an action based on the command portion and parameter portion. For example, if the command is "play" and the parameter is "preset one," then the PMSA 110 will begin to play preset one. If the command is "add" and the parameter is "Jon's favorites to preset two," then the media delivery system 112 (or PMSA 110) will add the playlist "Jon's favorites" to "preset two."

It should be noted that the method 900 might be carried out by the command processing engine 123 of the PMSA 110, the command processing application 121 of the media delivery system 112, or both.

In embodiments where the audible confirmation 1333 is not automatically played, i.e., an audible confirmation 1333 is only played if the output does not meet a threshold, the method continues with the steps described in FIGS. 11-14.

Figure 11:
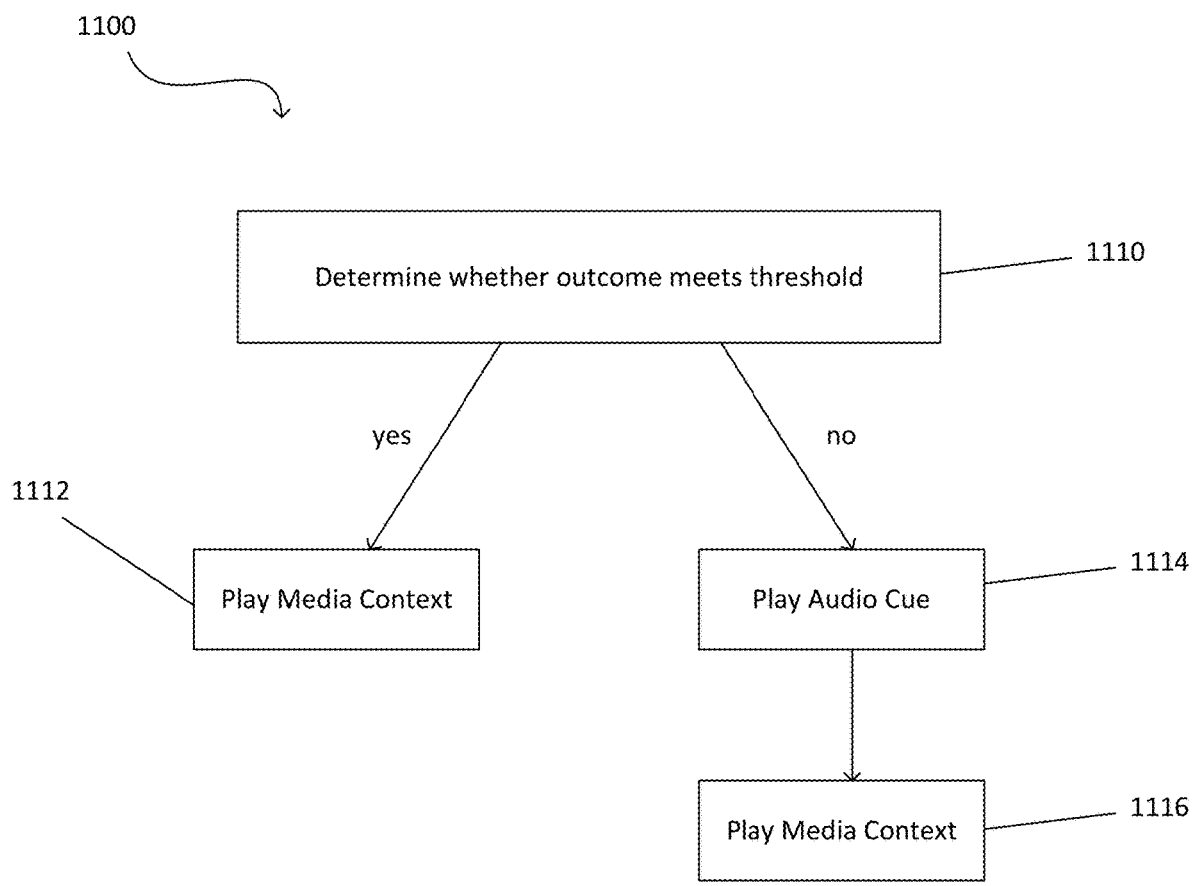
FIG. 11 schematically illustrates an exemplary method of determining a threshold level as described herein.

FIG. 11 illustrates an example method 1100 of determining whether an outcome meets a threshold at the command confirmation engine 129 or the command confirmation application 127. As described above, after the command portion and the parameter portion are analyzed, an outcome is determined. At step 1110, the command confirmation engine 129 or the command confirmation application 127 determine whether the outcome meets a predetermined threshold. A threshold is met in a number of different ways. In an example, where the command is to play a song, the threshold is met if the song starts quickly and is loud enough for the user to hear at the beginning of the song. A threshold may not be met if, for example, the song is very quiet at the beginning and/or the song has a slow introduction. Whether or not a media context, for example a song, meets a threshold is described in further detail with regard to FIGS. 13-14.

Still further, a threshold may not be met if the command is associated with something that does not produce an outcome including audio. For example, if a user's command is to add a playlist to a preset, there is no audio associated with such a command, so the threshold would not be met.

If the threshold is met, step 1112 includes playing the media context item. For instance, execution of a next-track command can have the effect of causing playback to advance to a next media content item in a currently playing context. In some instances, the output is an indication whether the command executed properly.

If the threshold is not met, step 1114 includes playing an audio cue. The threshold is not met if the media context associated with the command has a quiet introduction and/or does not play immediately. The threshold is also not met if no audio is associated with the command. In this instance, an audio cue is played immediately instead. The audio cue provides instant gratification to the user regarding their command.

An audio cue may be selected from a verbal response, in the form of voice messaging, or a non-verbal response such as a beep, a signal, a tone, or other similar sounds. The audio cue feedback is especially helpful when the outcome will take some time to be played back to the user, or to be recognized by the user, in response to the user command. The audio cue may also be determined to be a response or confirmation for the user.

After an audio cue is played, step 1116 includes playing the media context item. The media context item may be what the user requested via their instruction. If the command is not associated with an audio output, no further audio will be played.

Figure 12:
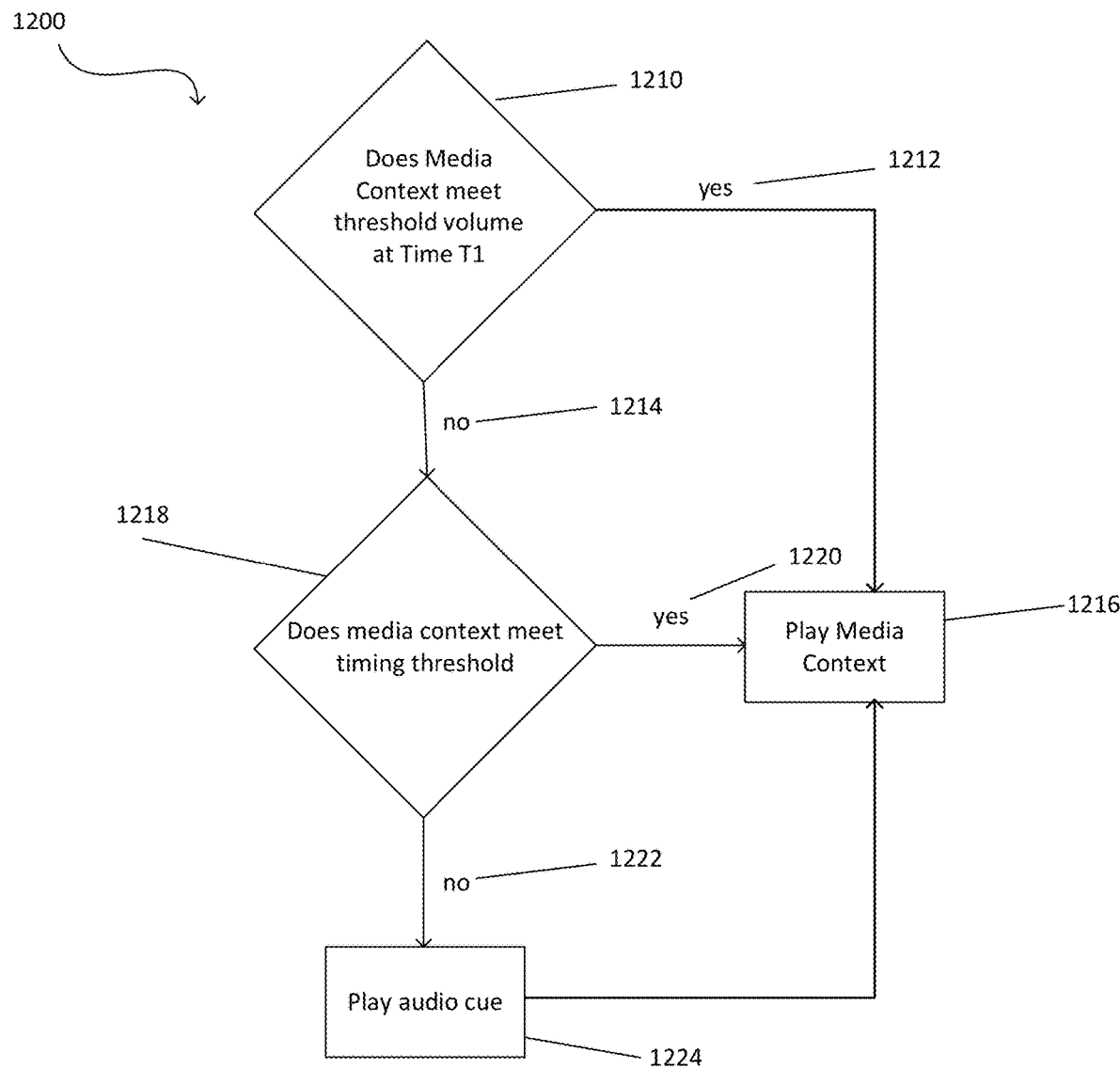
FIG. 12 schematically illustrates an exemplary method of determining a threshold level as described herein.

FIG. 12 illustrates an example method 1200 of determining whether the media context item (for example, a song) meets a threshold. Step 1210 includes determining whether the other media context meets a volume threshold at T1 1210. The threshold is described in detail below with regard to FIG. 13. T1 is defined as the time at which it takes to produce an audio cue, wherein the audio cue is unrelated to the other media context. Step 1212 includes determining that the media context meets the volume threshold, and then the other media context is played 1216. Step 1214 includes determining that the media context does not meet the volume threshold, so the method 1200 continues to step 1218. Alternatively, a threshold criterion may be tempo, or a volume and tempo combination.

Step 1218 includes determining whether the media context meeting a timing threshold. A timing threshold is defined as whether or not the media context plays at a detectable point before the time at which an audio cue may be played. A detectable point is a point at which the media context's amplitude is high enough that an average listener would become aware that a media context is playing. The detectable point is defined further with regard to FIG. 13. At step 1220, if the media context meets the timing threshold, then the media context is played 1216. At step 1222, if the media context does not meet the timing threshold, then the method continues to step 1224, which includes playing an audio cue. After the audio cue is played, the media context is played 1216.

Figure 13:
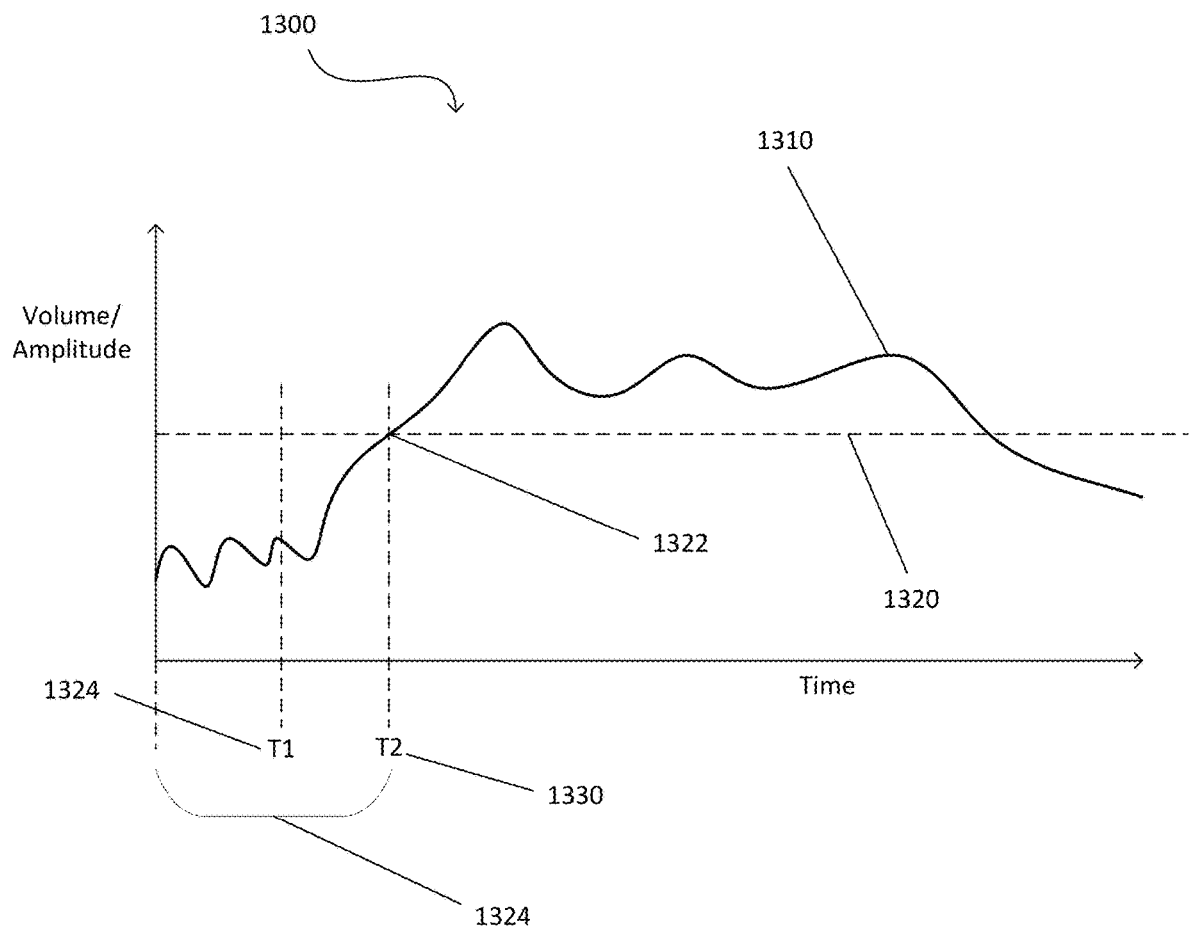
FIG. 13 illustrates an example embodiment of an amplitude of a song.

FIG. 13 is a graphical illustration of the amplitude of the beginning of a media context, in this example, a song 1300. However, determining the amplitude is not limited to songs. The song's amplitude 1310 is shown over time. The time T1 1324 represents the time it takes for an audio cue to be played. This time also represents the time at which a user expects a confirmation after uttering a command. The time T2 1330 represents the time at which the amplitude 1310 of the song reaches a volume level (or threshold 1320) that is audible to a level of recognition to the average listener.

The undetectable period 1324 is either the time the song is not playing or the amplitude is so low that an average user would not hear the song. The detectable point 1322 is the point at which the amplitude of the song becomes high enough that the volume of the song is audible to the average user. In embodiments, the user can personalize the threshold level 1320 and/or the detectable point 1322.

When time T1 occurs before time T2, then an audio cue is played before the song (if the command includes playing a song). If time T1 occurs after time T2, then an audio cue is not played, and the song itself is played initially. Alternatively, when time T1 occurs before time T2, an audio cue is played over and simultaneously with the song (if the command includes playing a song).

Figure 14:
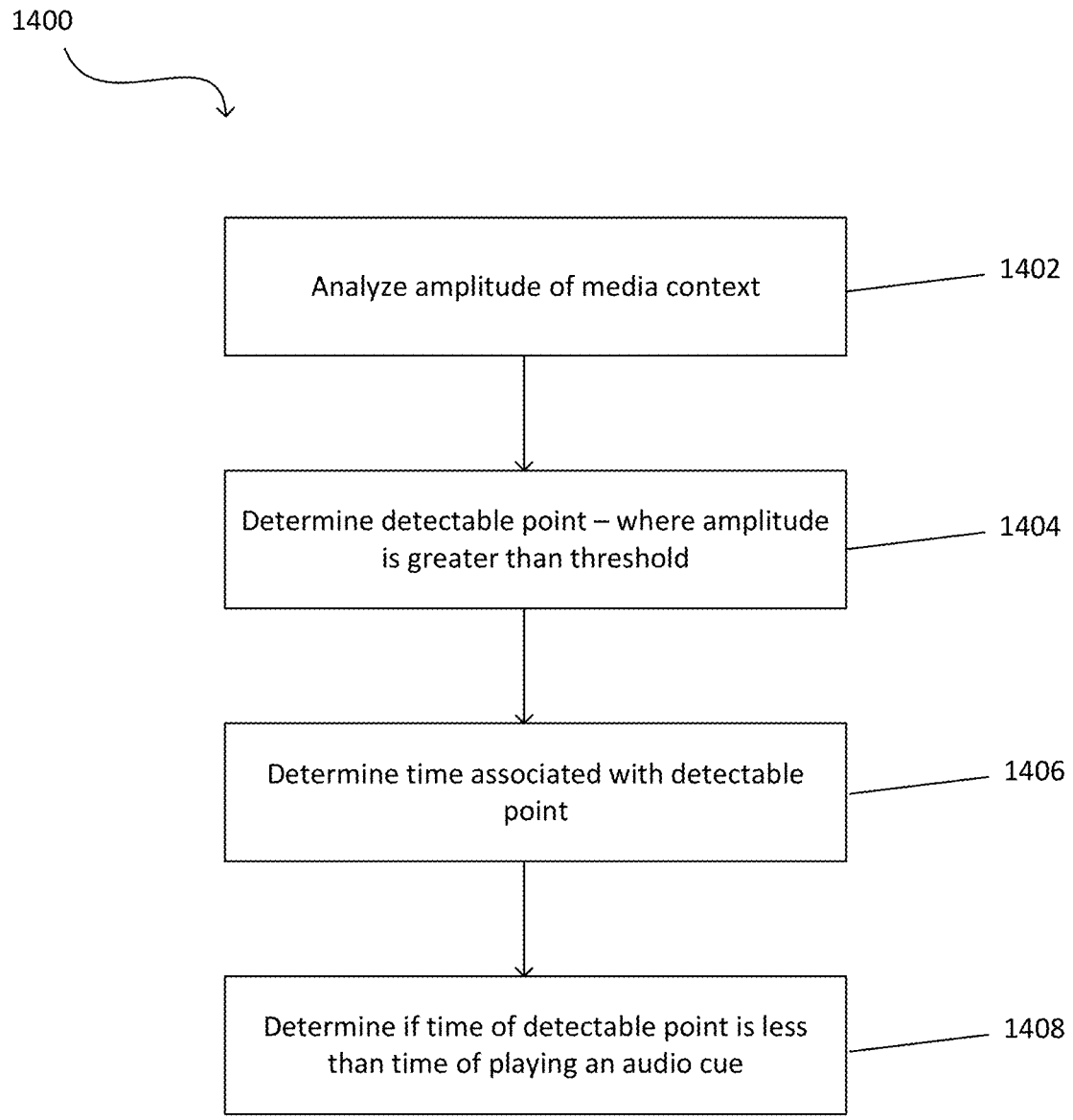
FIG. 14 schematically illustrates an exemplary method of analyzing the amplitude of a media context.

FIG. 14 illustrates an example method 1400 of analyzing the amplitude of a media context. At step 1402, the amplitude of a media context is analyzed. As shown in FIG. 13, the amplitude of an example song is shown over time. Next, at step 1404, the detectable point is determined. The detectable point is determined to be the point at which the amplitude is greater than a threshold. The threshold is generally the audible level of recognition to an average user. Alternatively, a user may set a different threshold.

At step 1406, the time associated with the detectable period is determined. This time is denoted as time T2. The time at which it takes an audio cue to be played is denoted as time T1.

At step 1408, it is determined if the time of the detectable point is less than the time to play an audio cue. If the detectable point occurs at a time after (or takes a greater amount of time to play) then an audio cue is played. After the audio cue is played, the media context plays. If the detectable point occurs at a time before (or takes a lesser amount of time to play) then an audio cue is not played, and the media context is played. If no media context (or audio content) is associated with the command, then only an audio cue is played.

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

What is claimed is:

1. A non-transitory computer-readable storage medium storing data instructions that, when executed by a processing device of a media playback device, cause the media playback device to:
   receive a voice command requesting playback of a media content item;
   when a beginning portion of the media content item has an amplitude below a threshold, play an audio cue and the media content item; and
   when a beginning portion of the media content item has an amplitude above the threshold, play the media content item without playing the audio cue;
   wherein playing the media content item comprises streaming the media content item from a server computing device.

2. The non-transitory computer-readable storage medium of claim 1, wherein the voice command is received from a user voice instruction including a speech-analysis activation trigger portion, a command portion, and a parameter portion, wherein the command portion and the parameter portion define the voice command requesting playback of the media content item.

3. The non-transitory computer-readable storage medium of claim 1, wherein the beginning portion extends from a beginning of the media content item to a predetermined period of time into the media content item.

4. The non-transitory computer-readable storage medium of claim 1, wherein the amplitude corresponds to an output volume of the media content item when the media content item is played.

5. The non-transitory computer-readable storage medium of claim 1, wherein the threshold is selected such that the beginning portion is undetectable to the user when the amplitude is below the threshold.

6. The non-transitory computer-readable storage medium of claim 1, wherein the data instructions further cause the media playback device to: determine whether the beginning portion of the media content item has an amplitude below the threshold.

7. The non-transitory computer-readable storage medium of claim 6, wherein the data instructions that cause the media playback device to determine whether the beginning portion of the media content item has an amplitude below the threshold further cause the media playback device to:
identify a detectable point in the media content item; and
determine whether the detectable point is within the beginning portion.

8. The non-transitory computer-readable storage medium of claim 1, wherein the audio cue is a verbal response.

9. The non-transitory computer-readable storage medium of claim 1, wherein the audio cue is a non-verbal response including a beep, a signal, or a tone.

10. A non-transitory computer-readable storage medium storing data instructions that, when executed by a processing device of a server computing device, cause the server computing device to:
receive a command from a media playback device requesting playback of a media content item, the command based on a voice command received from a user;
determine an amplitude of the media content item based on an output volume of the media content item when played;
when a beginning portion of the media content item has the amplitude below a threshold, initiate playback of an audio cue and the media content item at the media playback device; and
when a beginning portion of the media content item has the amplitude above the threshold, initiate playback of the media content item without initiating the audio cue;
wherein initiating playback of the media content item comprises streaming the media content item to the media playback device.

11. The non-transitory computer-readable storage medium of claim 10, wherein the voice command is received from a user voice instruction including a speech-analysis activation trigger portion, a command portion, and a parameter portion, wherein the command portion and the parameter portion define the voice command requesting playback of the media content item.

12. The non-transitory computer-readable storage medium of claim 10, wherein the beginning portion extends from a beginning of the media content item to a predetermined period of time into the media content item.

13. The non-transitory computer-readable storage medium of claim 10, wherein the amplitude corresponds to an output volume of the media content item when the media content item is played.

14. The non-transitory computer-readable storage medium of claim 10, wherein the threshold is selected such that the beginning portion is undetectable to the user when the amplitude is below the threshold.

15. The non-transitory computer-readable storage medium of claim 10, wherein the data instructions further cause the server to: determine whether the beginning portion of the media content item has an amplitude below the threshold.

16. The non-transitory computer-readable storage medium of claim 15, wherein the data instructions that cause the server to determine whether the beginning portion of the media content item has an amplitude below the threshold further cause the server to:
identify a detectable point in the media content item; and
determine whether the detectable point is within the beginning portion.

17. The non-transitory computer-readable storage medium of claim 10, wherein the audio cue is a verbal response.

18. The non-transitory computer-readable storage medium of claim 10, wherein the audio cue is a non-verbal response including a beep, a signal, or a tone.

19. A method of operating a media playback device, the method comprising:
receiving, at a media playback device, a voice command requesting playback of a media content item;
determining an amplitude of the media content item based on an output volume of the media content item when played;
selecting a threshold such that the media content item when played is undetectable to a user when the amplitude is below the threshold;
upon determining that the amplitude of a beginning portion of the media content item does not exceed the threshold, playing an audio cue from the media playback device and playing the media content item from the media playback device; and
upon determining that the amplitude of the beginning portion of the media content item meets or is above the threshold playing the media content item from the media playback device without playing the audio cue;
wherein playing the media content item from the media playback device comprises streaming the media content item from a server computing device.

20. The method of claim 19, wherein the voice command is received from a user voice instruction including a speech-analysis activation trigger portion, a command portion, and a parameter portion, wherein the command portion and the parameter portion define the voice command requesting playback of the media content item.

* * * * *